(12) United States Patent
Amei

(10) Patent No.: US 6,867,986 B2
(45) Date of Patent: Mar. 15, 2005

(54) CONSTANT CURRENT OUTPUT CONTROL METHOD AND CONSTANT CURRENT OUTPUT CONTROL DEVICE FOR SWITCHING POWER SUPPLY CIRCUIT

(75) Inventor: Toshihiro Amei, Nei-gun (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 10/748,591

(22) Filed: Dec. 29, 2003

(65) Prior Publication Data

US 2004/0196672 A1 Oct. 7, 2004

(30) Foreign Application Priority Data

Feb. 3, 2003 (JP) ........................................ 2003-026178

(51) Int. Cl.⁷ ............................................ H02M 3/335
(52) U.S. Cl. ...................... 363/21.01; 363/97; 363/131
(58) Field of Search ................................ 363/20, 21.01, 363/21.04, 21.05, 21.12, 21.13, 95, 97, 131

(56) References Cited

U.S. PATENT DOCUMENTS 4,071,884 A * 1/1978 Maigret .................. 363/21.04
4,646,218 A * 2/1987 Scholer ................... 363/21.08
6,201,713 B1 * 3/2001 Hosotani .................... 363/19
6,445,598 B1 * 9/2002 Yamada .................. 363/21.12
6,456,511 B1 * 9/2002 Wong ..................... 363/21.13

FOREIGN PATENT DOCUMENTS

JP  2002-136116 A1  5/2002

* cited by examiner

Primary Examiner—Adolf Berhane
(74) Attorney, Agent, or Firm—Darby & Darby

(57) ABSTRACT

A constant current output control method and device for a switching power supply circuit for constant current output control of an output current $I_{2o}$ of a rectifying smoothing. An OFF adjustment time T3 is:

$$T3 = T2 \times (Np \div Ns \times Ip_{ref} \div 2 \div I_{2oset} - 1) - T1 \qquad (1)$$

in which, $I_{2oset}$ represents a set output current of the rectifying smoothing circuit, Np represents a number of turns of a primary winding, Ns represents a number of turns of a secondary winding, T1 being a fixed time representing an ON time, $Ip_{ref}$ representing a reference peak current flowing in the primary winding, and T2 representing an output time during which output is generated from the rectifying smoothing circuit. Output current $I_{2o}$ during an oscillation period T becomes set output current $I_{2oset}$, and constant current output control can be executed by repeating this method.

18 Claims, 7 Drawing Sheets

CONSTANT CURRENT OUTPUT CONTROL METHOD AND CONSTANT CURRENT OUTPUT CONTROL DEVICE FOR SWITCHING POWER SUPPLY CIRCUIT

FIELD OF THE INVENTION

The present invention relates to a constant current output control method and a constant current output control device that execute constant current output control of an output current from a secondary side of a transformer of a switching power supply circuit.

BACKGROUND OF THE INVENTION

In a switching power supply circuit such as switching regulator, an exciting current is fed to a primary winding of a transformer thus causing energy stored in the transformer to be discharged as an output of a secondary output winding. The switching power supply circuit offers a stable power supply that is compact, lightweight and highly efficient, and is therefore utilized in power supply circuits such as battery chargers and AC adapters.

Conventionally, in this type of switching power supply circuit, an output voltage and current of a rectifying smoothing circuit of a secondary side are monitored such that excessively high power is not output from the rectifying smoothing circuit of the secondary side. The monitoring results are transmitted to a primary side using an insulated signal transmission element such as a photo coupler. On the primary side, an oscillating switching device is controlled so as to switch ON and OFF in accordance with the transmission signal. Constant current output control of the output current is executed by controlling an ON period (an energized period) and an OFF period of the exciting current fed to the primary winding (as in, for example, Japanese Patent Laid-Open Publication No. 2002-136116).

Hereinafter, a constant current output control executed by a conventional switching power supply circuit 100, like the one described above, will be explained with reference to a circuit diagram shown in FIG. 7.

A direct current power supply 1 is an unstable power supply configured from a high voltage side terminal 1a and a low voltage side terminal 1b. A transformer 2 is configured from a primary winding 2a and a secondary output winding 2b. An oscillating switching device 3 is formed from a field effect transistor. Further, an Ip detection resistor 22 detects a primary winding current Ip that flows in the primary winding 2a. The oscillating switching device 3 is connected between an end of the primary winding 2a, and the low voltage side terminal 1b via the Ip detection resistor 22. The oscillating switching device 3 is switched ON and OFF with a predetermined cycle, by a switching control circuit 101 that is connected to a gate. Accordingly, the entire switching power supply circuit 100 oscillates.

A rectifying diode 4 and a smoothing capacitor 13, which are shown in a secondary side output of the transformer 2, configure a rectifying smoothing circuit. The diode 4 and the smoothing capacitor 13 rectify and smooth an output of the secondary output winding 2b, which is then output between the high voltage side output line 20a and a low voltage side output line 20b. An output monitoring circuit is provided between the output lines 20a and 20b. This output monitoring circuit monitors the output voltage and the output current and is configured from a voltage monitoring circuit and a current monitoring circuit. In the case that either the output voltage or the output current exceeds a respective predetermined reference voltage and reference current, the output monitoring circuit causes a photo coupler light-emitting device 35a, shown in the drawing, to emit light.

In the voltage monitoring circuit, voltage dividing resistors 30 and 31 are connected in series between the high voltage side output line 20a and the low voltage side output line 20b. A divided voltage of an output voltage is obtained from an intermediate tap point 32 and is inputed to an inverted input terminal of a differential amplifier 33a. Further, a voltage monitoring reference supply 34a is connected between a non-inverted input terminal of the differential amplifier 33a and the low voltage side output line 20b, and inputs a first comparative voltage to the non-inverted input terminal for comparison with the divided voltage of the output voltage. A reference voltage is set to a selected value by changing respective resistance values of the voltage dividing resistors 30 and 31, or the first comparative voltage of the voltage monitoring reference supply 34a.

The photo coupler light-emitting device 35a is connected to an output side of the differential amplifier 33a. Further, the photo coupler light-emitting device 35a is connected to the high voltage side output line 20a via an electrical resistor 36, and is supplied with current from the drive power supply.

Moreover, a current detection resistor 43 is disposed in the low voltage side output line 20b in the current monitoring circuit, and one end of the current detection resistor 43 is connected to the inverted input terminal of the differential amplifier 33, and the other end is connected to the non-inverted input terminal via a current monitoring reference supply 34b.

Accordingly, an output current that flows in the low voltage side output line 20b is indicated by a potential difference between both ends of the current detection resister 43. It can be determined whether this output current exceeds the predetermined reference current by comparison with a second comparative voltage of the current monitoring reference supply 34b in a differential amplifier 33b. A reference current is set to a selected value by changing a resistance value of the current detection resistor 43, or the second comparative voltage of the voltage monitoring reference supply 34b. An output side of the differential amplifier 33b is connected to a connection point of the output side of the differential amplifier 33a for monitoring the output voltage and the photo coupler light-emitting device 35a.

Furthermore, the resistor 37a and the capacitor 38a, and the resistor 37b and the capacitor 38b, which are respectively connected in-series, act as alternating current negative feedback devices that cause operation of the differential amplifier 33a and the differential amplifier 33b, respectively, to be stable.

At the primary side of the transformer 2, a photo coupler light-receiving device 35b photo coupling with the photo coupler light-emitting device 35a is connected between the switching control circuit 101 and the low voltage side terminal 1b of the direct current power supply 1.

The switching control circuit 101 incorporates a variable reference supply 101a that outputs a variable voltage in accordance with a collector current of the photo coupler light-receiving device 35b that is configured from a phototransistor; a comparator 101b; an oscillator 101c; and an AND gate 101d.

An inverted input of the comparator 101b is connected to a connection point of the oscillating switching device 3 and the Ip detection resistor 22, and a non-inverted input of the comparator 101b is connected to the variable reference supply 101a. Accordingly, a voltage by the Ip detection resistor 22a represented current Ip which flows in the primary winding 2a and a voltage output from the variable reference supply 101a represented light amount of a limit signal received by the photo coupler light-receiving device 35b from the photo coupler light-emitting device 35a are compared.

An output of the comparator 101b is input to the AND gate 101d along with an output of the oscillator 101c. Further, an output of the AND gate 101d is connected to a gate of the oscillating switching device 3.

With regard to the operation of the switching power supply circuit 100 configured in this way, when the variable reference supply 101a does not receive collector current from the photo coupler light-emitting device 35a, namely, in a normal operating state where the output is stable, a reference voltage Vset set to a predetermined value from the variable reference supply 101a is output to the non-inverted input of the comparator 101b.

On the other hand, the voltage of the Ip detection resistor 22 that indicates the current Ip that flows in the primary winding 2a is input to the inverted input of the comparator 101b. The reference voltage Vset is compared to a primary winding current Ip that increases with the elapse of time once the oscillating switching device 3 has been switched to ON. Accordingly, the comparator 101b outputs "H" until the voltage indicating the primary winding current Ip reaches the reference voltage Vset, and then outputs "L" once the reference voltage Vset has been exceeded.

The oscillator 101c outputs a clock pulse that accords with an oscillation period T of the switching power supply circuit 100 to the AND gate 101d. As a result, the AND gate 101d outputs "H" when the clock pulse is "H" and the output of the comparator 101b is "H", namely, when the voltage that indicates the primary winding current Ip has not reached the reference voltage Vset, and controls the oscillating switching device 3 to switch ON.

In contrast to this, when the output current increases past the reference current due to load connected between the high voltage side line 20a and the low voltage side line 20b, the voltage input to the inverted input terminal of the differential amplifier 33b rises. Thus, the potential difference between this voltage and the second comparative voltage is inverted and amplified, and reaches a potential that exceeds a light-emitting threshold value of the photo coupler light-emitting device 35a.

Furthermore, even when the output voltage increases past the reference voltage due to load connected between the high voltage side line 20a and the low voltage side line 20b, the divided voltage input to the inverted input terminal of the differential amplifier 33b also rises. Thus, the potential difference between this voltage and the first comparative voltage is inversely amplified, and reaches a potential that exceeds the light-emitting threshold value of the photo coupler light-emitting device 35a.

Accordingly, when either one of the output voltage and the output current exceeds the respective reference voltage or reference current, the photo coupler light-emitting device 35a emits a limit signal of an emitted light amount to the photo coupler light-receiving device 35b, in accordance with the respective exceeded amount.

When the photo coupler light-receiving device 35b receives the limit signal from the photo coupler light-emitting device 35a, the output voltage of the variable reference supply 101a reduces from the reference voltage Vset in accordance with the increase in the received light amount. Thus, the output of the comparator 101b is rapidly switched to "L", as compared to the normal operation in which the reference voltage Vset is output.

As a result, the oscillating switching device 3 is switched on, a time T1 for which the primary winding 2a is excited is made shorter, and the energy stored in the transformer 2 reduces within one oscillation period. Accordingly, the output voltage or the output current, which respectively exceed the reference voltage or the reference current, spontaneously reduce, and become equal to or less than the reference voltage or the reference current.

Then, the photo coupler light-emitting device 35a stops emitting light and the photo coupler light-receiving device 35b no longer receives the limit signal. Accordingly, the oscillating switching device 3 once again repeats oscillation that is controlled according to the reference voltage Vset, and a stable output that accords with the power supplied to the load can be obtained.

In order to execute control to realize a constant current, the constant current output control method of this conventional switching power supply circuit 100 is provided with the current detection resistor 43 and the current monitoring reference supply 34b in the current monitoring circuit; the variable reference supply 101a that outputs the reference voltage Vset in the switching control circuit 101; and the Ip detection resistor 22 in-series with the primary winding 2a. However, as a result of variation of circuit constants of the these circuit devices, variation of the integrated circuit itself when the switching control circuit 101 acts as an integrated circuit, and the like, a problem arises since stable and simple mass production of products having highly accurate constant current output characteristics is difficult.

Furthermore, in case, the different output current characteristics of the switching power supply circuit are required, it becomes necessary to set each of the aforementioned circuit constants and the like, on each occasion that different output characteristics are required, or necessary to exchange circuit components, and so on. Accordingly, costs are increased due to factors such as an increase in time spent on intricate design and circuit component adjustment.

Moreover, the output current detection circuit is provided at the secondary side of the transformer 2, and as a result, the number of components in the circuit is increased, thereby causing the overall circuit to become larger.

In addition, increase in the output current detected by the output current detection circuit of the secondary side of the transformer 2 is adjusted by control of the primary side. Accordingly, it is necessary to provide the photo coupler light-emitting device 35a, the photo coupler light-receiving device 35b, and other elements which leads to an increase in cost, as well as the circuit configuration becoming more complicated.

OBJECTS AND SUMMARY OF THE INVENTION

In light of the aforementioned circumstances, it is an object of the present invention to provide a constant current output control method and a constant current output control device for a switching power supply circuit. This constant current output control method and device are capable of accurately executing constant current output control of an output current even if there is variation of a utilized circuit element or an integrated circuit.

Further, a further object of the present invention is to provide a constant current output control method and a constant current output control device for a switching power supply circuit that allow mass production of switching power supply circuits having different output current specifications, using the same circuit components.

Moreover, a further object of the present invention is to provide a constant current output control method and a constant current output control device for a switching power supply circuit that execute a constant current output control using only a primary side of a transformer. Accordingly, an output current detection circuit, an optically coupled device, or the like, need not be provided at a secondary side of a transformer.

In order to address the aforementioned problems, according to an aspect of the invention, there is provided a constant current output control method for a switching power supply circuit having a transformer provided with a primary winding and a secondary output winding; an oscillating switching device that is connected in-series with the primary winding so as to connect the primary winding to an energizing direct current power supply; a switching control circuit that executes ON/OFF control of the oscillating switching device; and a rectifying smoothing circuit that rectifies and smoothes an output of the secondary output winding; this constant current output control method for changing an ON/OFF time of the oscillating switching device of the switching power supply circuit, and executing a constant current output control of an output current $I_{2o}$ of the rectifying smoothing circuit, characterized by the steps of:

deriving an OFF adjustment time T3 based on equation (1), $$T3 = T2 \times (Np \div Ns \times Ip_{ref} \div 2 \div I_{2oset} - 1) - T1 \quad (1)$$

where, $I_{2oset}$ represents a set output current of the rectifying smoothing circuit for which the constant current output control is to be executed, Np represents a number of turns of the primary winding, Ns represents a number of turns of the secondary output winding, T1 being a fixed time representing an ON time of the oscillating switching device that excites the primary winding during an oscillation period T; $Ip_{ref}$ representing a reference peak current flowing in the primary winding when the ON time T1 completely elapses; and T2 representing an output time during which output is generated in the rectifying smoothing circuit: then controlling an OFF time of the oscillating switching device during the oscillation period T such that the OFF time is equal to the sum of the output time T2 and the OFF adjustment time T3; and setting the output current $I_{2o}$ of the rectifying smoothing circuit to the set output current $I_{2oset}$.

According to another aspect of the invention, there is provided a constant current output control method for a switching power supply circuit having a transformer provided with a primary winding and a secondary output winding; an oscillating switching device that is connected in-series with the primary winding so as to connect the primary winding to an energizing direct current power supply; a switching control circuit that executes ON/OFF control of the oscillating switching device at a fixed oscillation period $T_c$; and a rectifying smoothing circuit that rectifies and smoothes an output of the secondary output winding. This constant current output control method for changing an ON/OFF time of the oscillating switching device of the switching power supply circuit, and executing a constant current output control of an output current $I_{2o}$ of the rectifying smoothing circuit is characterized by the steps of: detecting an output time T2 during which output is generated in the rectifying smoothing circuit; and deriving a set current $Ip_{set}$ based on equation (2), $$Ip_{set} = 2 \times Ns \div Np33 \ 1_{2oset} \times T_c \div T2 \quad (2)$$

where, $T_c$ represents the fixed oscillation period, $I_{2oset}$ represents a set output current of the rectifying smoothing circuit for which the constant current output control is to be executed, Np represents a number of turns of the primary winding, and Ns represents a number of turns of the secondary winding. Next, adjusting an ON time T1 by stopping ON control of the oscillating switching device when a current Ip flowing in the primary winding reaches the set current $Ip_{set}$; and setting the output current $I_{2o}$ of the rectifying smoothing circuit to the set output current $I_{2oset}$.

According to a further aspect of the invention, there is provided a constant current output control method for a switching power supply circuit, further characterized in that the output time T2 during which output is generated in the rectifying smoothing circuit is detected based on a time from when flyback voltage is generated in the primary winding until when a first polarity reversal occurs.

According to another aspect of the invention, there is provided a constant current output control method for a switching power supply circuit, further characterized in that the output time T2 during which output is generated in the rectifying smoothing circuit is detected based on a time from when flyback voltage is generated in an auxiliary winding of the transformer until when a first polarity reversal occurs.

According to a further aspect of the invention, there is provided a constant current output device for a switching power supply circuit having a transformer provided with a primary winding and a secondary output winding; an oscillating switching device that is connected in-series with the primary winding so as to connect the primary winding to an energizing direct current power supply; and a rectifying smoothing circuit that rectifies and smoothes an output of the secondary output winding; this constant current output device changing an ON/OFF time of the oscillating switching device of the switching power supply circuit, and executing a constant current output control of an output current $I_{2o}$ of the rectifying smoothing circuit. The device including a switching control circuit that detects a primary winding current Ip flowing in the primary winding following execution of ON control of the oscillating switching device, and executes OFF control of the oscillating switching device when a primary winding current Ip reaches a set reference peak current $Ip_{ref}$. An ON time detection portion that detects an ON time T1 of the oscillation switching device; and an output time detection portion that detects an output time T2 during which output is generated from the rectifying smoothing circuit; and an adjustment time calculation circuit that derives an OFF adjustment time T3 from the reference peak current $Ip_{ref}$, the ON time T1 detected by the ON time detection portion, the output time T2 detected by the output time detection portion, based on equation (1), $$T3 = T2 \times (Np \div Ns \times Ip_{ref} \div 2 \div I_{2oset} - 1) - T1 \quad (1)$$

where, $I_{2oset}$ represents a set output current of the rectifying smoothing circuit for which the constant current output control is to be executed, Np represents a number of turns of the primary winding, and Ns represents a number of turns of the secondary winding, and wherein, the switching control circuit executes ON control of the oscillating switching device when the OFF time has elapsed during an oscillation cycle T, this OFF time being the sum of the output time T2 and the OFF adjustment time T3, and sets the output current $I_{2o}$ of the rectifying smoothing circuit to the set output current $I_{2oset}$.

According to another aspect of the invention, there is provided a constant current output device for a switching power supply circuit having a transformer provided with a primary winding and a secondary output winding; an oscillating switching device that is connected in-series with the primary winding so as to connect the primary winding to an energizing direct current power supply; a switching control circuit that executes ON/OFF control of the oscillating switching device at a fixed oscillation period $T_c$; and a rectifying smoothing circuit that rectifies and smoothes an output of the secondary output winding; this constant current output device changing an ON/OFF time of the oscillating switching device of the switching power supply circuit, and executing a constant current output control of an output current $I_{2o}$ of the rectifying smoothing circuit. The device having a primary side current detection portion that detects a current Ip flowing in the primary winding and an output time detection portion that detects an output time T2 during which output is generated in the rectifying smoothing circuit during an oscillation period T. A set value calculation circuit that derives a set current $Ip_{set}$ from the output time T2 detected by the output time detection portion, according to equation (2), $$Ip_{set}=2\times Ns \div Np \times 1_{2oset} \times T_c \div T2 \qquad (2)$$

where, $T_c$ represents the fixed oscillation period, $I_{2oset}$ represents a set output current of the rectifying smoothing circuit for which the constant current output control is to be executed, Np represents a number of turns of the primary winding, and Ns represents a number of turns of the secondary winding. A current comparator that compares the current Ip flowing in the primary winding and the set current $Ip_{set}$, wherein the switching control circuit stops ON control of the oscillating switching device when the current Ip reaches the set current $Ip_{set}$, adjusts the ON time T1, and sets the output current $I_{2o}$ of the rectifying smoothing circuit to the set output current $I_{2oset}$.

According to a further aspect of the invention, there is provided a constant current output control device for a switching power supply circuit, further characterized by a primary winding voltage monitoring circuit that monitors a voltage $V_{2a}$ of the primary winding, and detects a time from generation of flyback voltage in the primary winding until a first polarity reversal, wherein the time from generation of flyback voltage in the primary winding until the first polarity reversal is taken to be output time T2.

According to another aspect of the invention, there is provided a constant current output control device for a switching power supply circuit, includes an auxiliary winding further provided at the primary side of the transformer; and an auxiliary winding voltage monitoring circuit that monitors a voltage $V_{2a}$ of the primary winding, and detects a time from generation of flyback voltage in the auxiliary winding until a first polarity reversal, wherein the time from generation of flyback voltage in the auxiliary winding until the first polarity reversal is taken to be output time T2.

According to a further aspect of the invention, there is provided a constant current output control device for a switching power supply circuit, having an elapsed time estimation portion that estimates an OFF elapsed time T3' for executing OFF control of the oscillating switching device, following elapse of the output time T2; a calculation portion that sets a comparison time $T2_{ref}$ by multiplying the output time T2 by $(Np \div Ns \times Ip_{ref} \div 2 \div I_{2oset}-1)$; and an OFF time comparator that sets potentials $V_{T1}$, $V_{T3}'$, and $V_{T2ref}$ by respectively voltage converting, through multiplication by equal constants, the ON time T1 detected by the ON time detection portion, the OFF elapsed time T3' estimated by the elapsed time estimation portion, and the comparison time $T2_{ref}$ calculated by the calculation portion and compares the sum of the potentials $V_{T3'}$ and $V_{T1}$ with $V_{T2ref}$. The ON control of the oscillating switching device is executed when the sum of potentials $V_{T3'}$ and $V_{T1}$ exceeds $V_{T2ref}$.

According to another aspect of the invention, there is provided a constant current output control device for a switching power supply circuit, further characterized in that the switching control circuit executes OFF control of the oscillation switching device when a current Ip' reaches the reference peak current $Ip_{ref}$, the current Ip' being derived from Equation (3), $$Ip'=Ip+\delta t \times Vcc \div Lp \qquad (3)$$

where, $\delta t$ represents a time difference from detection of when the primary winding current Ip reaches the reference peak current $Ip_{ref}$ until ON operation of the oscillating switching device is stopped, Vcc represents a power supply voltage of the direct current power supply, and Lp represents an inductance of the primary winding.

According to the eleventh aspect of the invention, there is provided a constant current output control device for a switching power supply circuit, further characterized in that the primary side current detection portion detects the current Ip based on a voltage drop $V_{ip}$ from a resistance value $r_{ip}$ of an Ip detection resistor that is connected in-series with the primary winding, and the current comparator compares the voltage drop $V_{ip}$ with a set potential $V_{iset}$ that is a multiple of the set current $Ip_{set}$ and the resistance value $r_{ip}$, and compares the current Ip to the set current $Ip_{set}$.

According to another aspect of the invention, there is provided a constant current output control device for a switching power supply circuit, further characterized in that the current Ip' is taken as the current Ip and compared to the set current $Ip_{set}$, this current Ip' being derived from Equation (3), $$Ip'=Ip+\delta t \times Vcc \div Lp \qquad (3)$$

where, $\delta t$ is a time difference from detection of when the primary winding current Ip reaches the current $Ip_{set}$ until ON operation of the oscillating switching device is stopped, Vcc represents the power supply voltage of the direct current power supply, and Lp represents the inductance of the primary winding.

According to two aspects of the present invention, an output time T2 during which output is generated in a rectifying smoothing circuit during one oscillation period T is detected, and then substituted into Equation (1). Based on Equation (1), an OFF adjustment time T3 is obtained for setting an output current $I_{2o}$ of the rectifying smoothing circuit to a set output current $I_{2oset}$. An OFF time during one oscillation period T is adjusted so as to become equal to a sum of the output time T2 and the OFF adjustment time T3. The output current $I_{2o}$ during this one oscillation period T is equal to the set output current $I_{2oset}$, and thus it is possible to execute constant current output control of the set output current.

Even if there is variation in a circuit constant of each circuit element, only the output time T2 changes. Accordingly, Equation (1) for obtaining the OFF adjustment time T3 for executing constant current output control is not affected by the variations, since the output time T2 that changes is obtained first. As a result, it is possible to execute accurate constant current output control when the circuits are mass produced.

Further, if each circuit constant of Equation (1) is obtained in advance, it is possible to execute constant current output control for different switching power supply circuits having the same structure but different output currents, simply by changing the numerical value of the output current $I_{2oset}$. Thus, even in the case of switching power supply circuits in which the specifications of the output current $I_{2o}$ are different, it is possible to execute constant current output control using the same circuit components and devices, simply by changing a reference peak current $Ip_{ref}$ or the OFF adjustment time T3.

According to other aspects of the present invention, the output time T2 during which output is generated in a rectifying smoothing circuit during one fixed oscillation period $T_c$ is detected, and then substituted into Equation (2). Based on Equation (2), a set current $Ip_{set}$ is obtained for setting the output current $I_{2o}$ of the rectifying smoothing circuit to the set output current $I_{2oset}$.

When a current Ip that flows in a primary winding reaches the set current $Ip_{set}$, ON control of an oscillating switching device is stopped, and an ON time T1 is adjusted. The current Ip during this oscillation period T is equal to the set current $Ip_{set}$, and the output $I_{2o}$ of the rectifying smoothing circuit becomes the set output current $I_{2oset}$. Accordingly, it is possible to accurately obtain a set output current.

Even if there is variation in the circuit constant of each circuit element, only the output time T2 changes. Accordingly, Equation (2) for obtaining the set current $Ip_{set}$ for constant current output control is not affected by the variation, since the output time T2 that changes is obtained first. As a result, it is possible to execute accurate constant current output control when the circuits are mass produced.

Further, if each circuit constant of Equation (2) is obtained in advance, it is possible to execute constant current output control for switching power supply circuits having the same structure but different output currents, simply by changing the numerical value of the set output current $I_{2oset}$. Thus, even in the case of switching power supply circuits with different specifications of the output current $I_{2o}$, it is possible to execute constant current output control using the same circuit components and devices, simply by changing the set current $Ip_{set}$.

Further, because of the period of oscillation is fixed, the circuit simplification is possible.

In addition, it is possible to execute the constant current output control using circuit components and devices that execute constant voltage control of an output voltage, with virtually no modification thereof.

According to further aspects of the present invention, the output time T2, during which output is generated in the rectifying smoothing circuit, is a discharge time of energy stored in the transformer. This output time T2 is equal to the time from when the oscillating switching device is switched off, until the time when the polarity of the primary winding reverses due to the flyback voltage generated in the primary winding reducing and free oscillation beginning. Accordingly, it is possible to detect the output time T2 from the primary side of the transformer by monitoring a potential of the primary winding, without having to monitor the output of the rectifying smoothing circuit.

Accordingly, it is not necessary to provide a transmission element for transmitting a detection result of the secondary side to the primary side, and thus it becomes possible to execute constant current output control using only the primary side of the circuit.

According to further aspects of the present invention, the output time T2, during which output is generated in the rectifying smoothing circuit, is equal to the time from when flyback voltage is generated in an auxiliary winding until when polarity of an auxiliary winding reverses. Accordingly, it is possible to detect the output time T2 from the primary side of the transformer by monitoring a potential of the auxiliary winding of the primary side of the transformer, without having to monitor the output of the rectifying smoothing circuit.

Accordingly, it is not necessary to provide a transmission element for transmitting a detection result of the secondary side to the primary side, and thus it becomes possible to execute constant current output control using only the primary side of the circuit.

According to an aspect of the present invention, an OFF elapsed time T3', for executing OFF control following elapse of the output time T2, increases with the elapse of time. When the OFF elapsed time T3' reaches the OFF adjustment time T3 that satisfies Equation (1), the sum of voltage converted potentials $V_{T3'}$ and $V_{T1}$ exceeds $V_{T2ref}$. Accordingly, if control is executed at this time so as to switch the oscillating switching device on for the next oscillation, it is possible to generate oscillation during the oscillation period T that includes the OFF adjustment time T3 satisfying Equation (1). As a result, the output current $I_{2o}$ of the rectifying smoothing circuit becomes the set output current $I_{2oset}$ for executing constant current output control.

The ON time T1, the output time T2 and the comparison time $T2_{ref}$, which is a multiple of the constants in Equation (1) are indicated respectively by the voltage-converted potentials $V_{T1}$, $V_{T2}$ and $V_{T2ref}$. Accordingly, it is possible to obtain the OFF adjustment time T3 that satisfies Equation (1) using a comparator that adopts a comparator, instead of executing calculation processing.

According to another aspect of the present invention, the primary winding current Ip, after the oscillating switching device is switched on, increases along with the elapse of time and is approximately proportional to a power supply voltage Vcc÷Lp. Accordingly, δt×Vcc÷Lp of Equation (3) indicates an increase portion of the primary winding current Ip resulting from the delay δt between operations of the primary side current detection portion and the oscillating switching device.

Accordingly, when a current Ip' which is obtained by adding δt×Vcc÷Lp to the primary winding current Ip, reaches a reference peak current $Ip_{ref}$ and the oscillating switching device is controlled to switch to OFF, the primary winding current Ip at the time is substantially equal to the reference peak current $Ip_{ref}$. As a result, it is possible to execute accurate constant current output control even if there is a delay between operations of the primary side current detection portion of the transformer and the oscillating switching device.

According to a further aspect of the present invention, the primary side current Ip and the set current $Ip_{set}$ are indicated by voltages, namely, a voltage drop $V_{ip}$ and a set potential $V_{iset}$. By being compared the voltage drop $V_{ip}$ with the set potential $V_{iset}$, the primary side current Ip when the oscillating switching device is switched to OFF is set to the set current $Ip_{set}$. As a result, comparison can be easily executed by a comparator using a comparator, and there is no need to execute conversion processing to current values.

According to another form of the twelfth aspect of the present invention, after the oscillating switching device is switched on, the primary winding current Ip increases along with the elapse of time and is approximately proportional to the power supply voltage Vcc÷Lp. Accordingly, δt×Vcc÷Lp of Equation (3) indicates an increase portion of the primary side current Ip resulting from the delay δt between operations of the primary side current detection portion and the oscillating switching device.

Thus, comparison is made with the set current $Ip_{set}$ to which $\delta t \times Vcc \div Lp$ is added, and the primary winding current Ip when the oscillating switching device is switched to OFF is set to be substantially equal to the set current $Ip_{set}$. Accordingly, it is possible to execute accurate constant current output control even if there is a delay, resulting from circuit operation factors, between operations of the primary side current detection portion of the transformer and the oscillating switching device.

BRIEF DESCRIPTION OF THE DRAWINGS

FIG. 3 is a graph showing a relationship between the current Ip flowing in the primary winding, and a time t when the switching device is switched on;

DETAILED DESCRIPTION OF THE PREFERRED EMBODIMENTS

Figure 7:
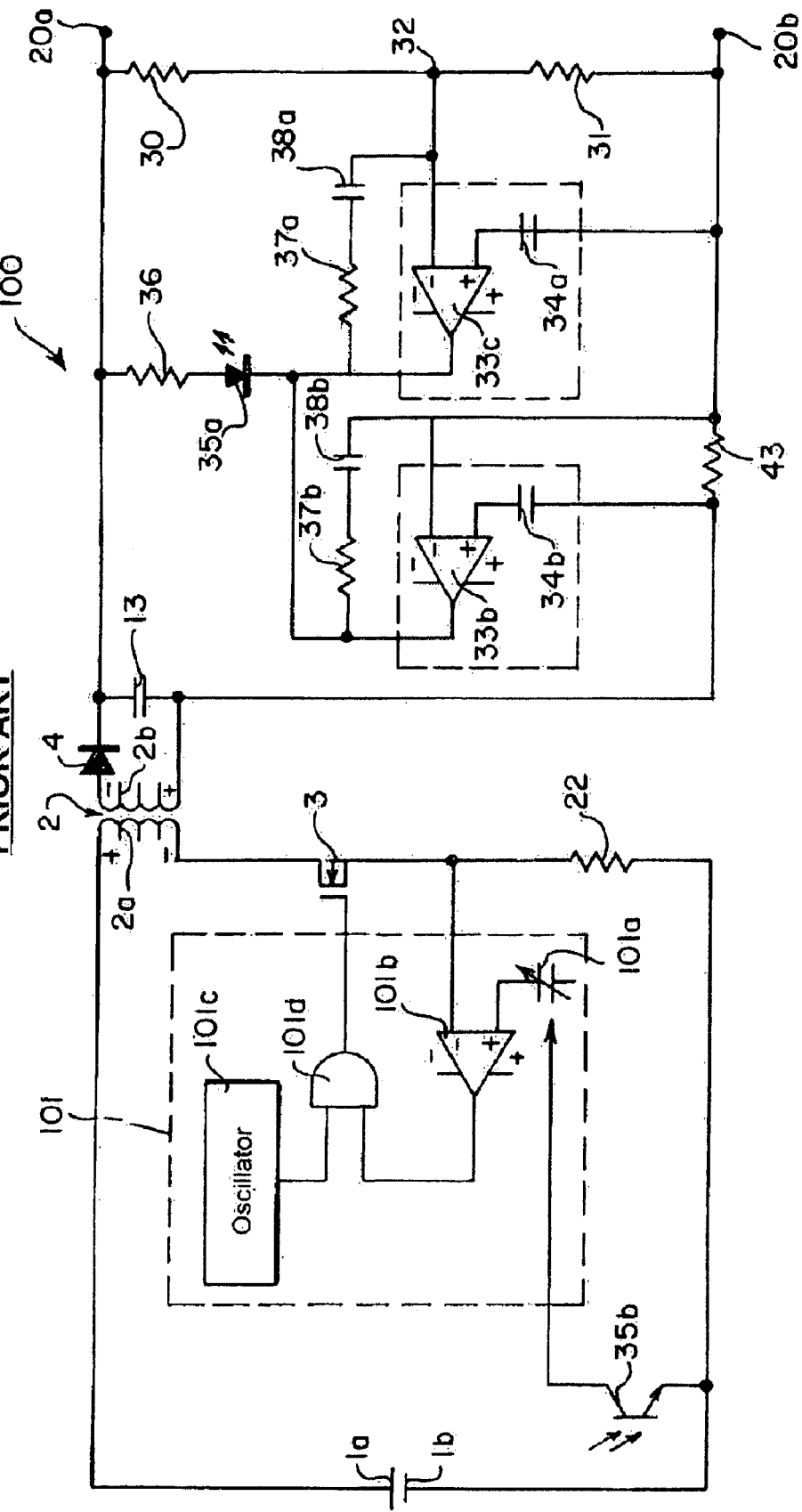
FIG. 7 is a circuit diagram of a conventional switching power supply circuit.

Hereinafter, an embodiment of the present invention will be described with reference to the drawings. With regard to the drawings, it should be noted that structural members that are the same as those in the conventional switching power supply circuit 100 shown in FIG. 7, will be denoted with the same reference numerals.

Figure 1:
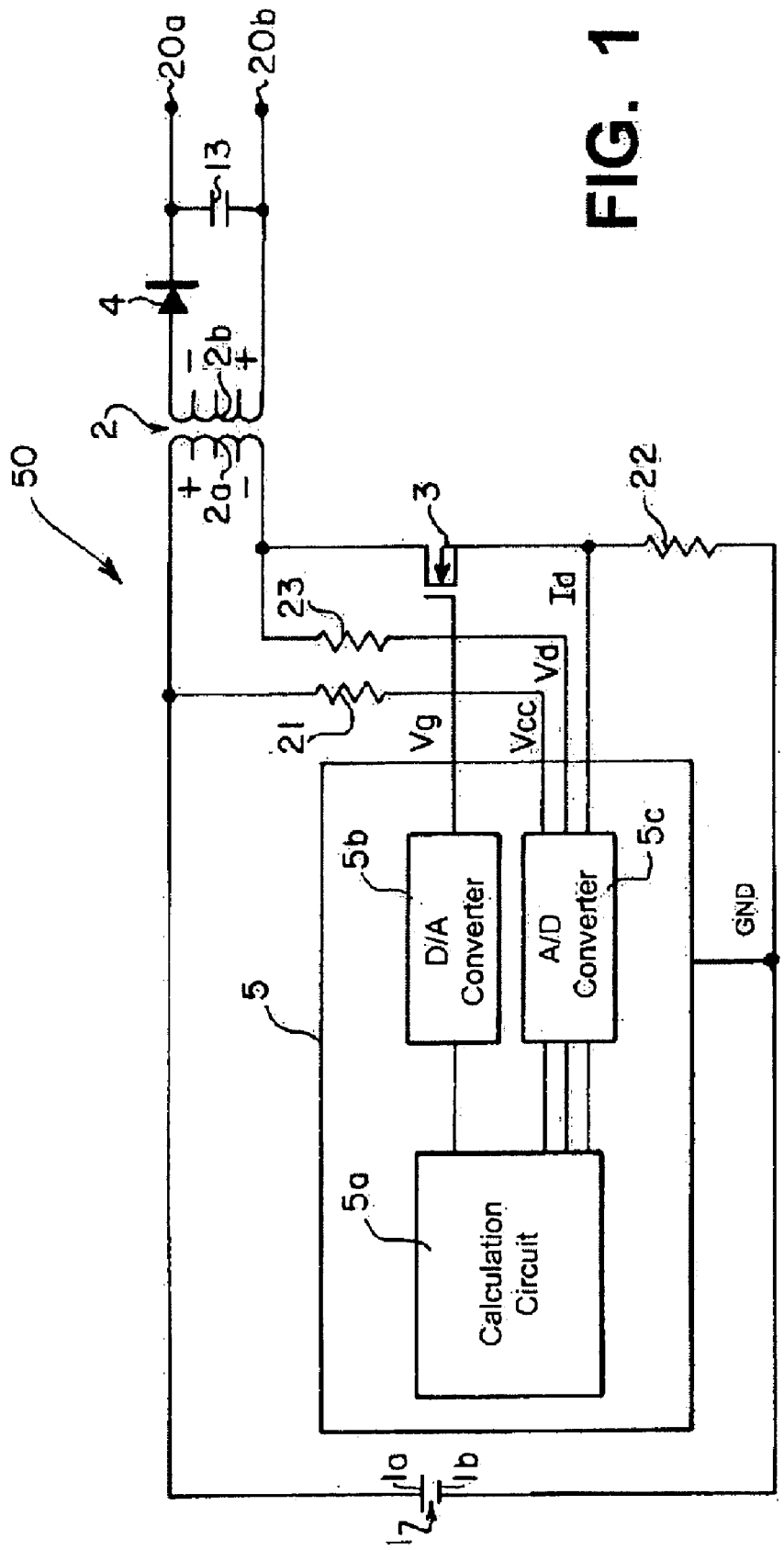
FIG. 1 is a circuit diagram of a switching power supply circuit according to an embodiment of the present invention.

FIG. 1 is a circuit diagram of a switching power supply circuit 50 according to the present invention. Switching power supply circuit 50 adopts a simple configuration in which the conventional current monitoring circuit (illustrated in FIG. 7) on the secondary output side, or the optically coupled device, are not utilized.

In FIG. 1, an unstable direct current power supply 1 that allows variation in voltage has a high voltage side terminal 1a and a low voltage side terminal 1b. Further, a transformer 2 is provided with a primary winding 2a and secondary output winding 2b. A field effect transistor (FET) 3 acts as an oscillating switching device (hereinafter referred to as a "switching device"). The switching device 3 is, in this case, a MOS type, insulated gate FET. The switching device 3 has a drain connected to one end of the primary winding 2a, and a source connected to the low voltage side terminal 1b via an Ip detection resistor 22. The gate is connected to a switching control circuit 5 that executes ON/OFF control of the switching device 3.

The switching control circuit 5 integrates a calculation circuit 5a, a D/A converter 5b, and an A/D converter 5c, on a single-chip circuit component. Accordingly, analog input terminals Vcc, Vd and Id of the A/D converter 5c are respectively connected to the high voltage side terminal 1a via a resistor 21; a low voltage side end portion of the primary winding 2a via a resistor 23; and a connection point of the Ip detection resistor 22 and the switching device 3.

In addition, an analog output terminal Vg of the D/A converter 5b is connected to the gate of the switching device 3, and executes ON/OFF control of the switching device 3 through application of a forward biased voltage to the gate at a predetermined timing described hereinafter. Accordingly, oscillation control of the entire switching power supply circuit 50 is executed.

A fundamental operation of this switching power supply circuit 50 will be explained briefly with reference to FIGS. 2a–c. When the switching device 3 is switched on, an exciting current Ip (hereinafter referred to as "primary winding current") begins to flow in the primary winding 2a that is connected in-series, and an induced electromotive force is generated in each winding of the transformer 2.

Next, following a predetermined ON time T1, the switching device 3 is switched off by the switching control circuit 5. When the switching device 3 switches to OFF, the current flowing in the primary winding 2a is effectively interrupted, and so-called flyback voltage is generated in each winding of the transformer 2. At this time, the flyback voltage generated in the secondary output winding 2b is rectified and smoothed by rectifying smoothing circuits 4, configured from a rectifying diode and a smoothing capacitor, and then output as power supplied to a load connected between output lines 20a and 20b.

Figure 2A:
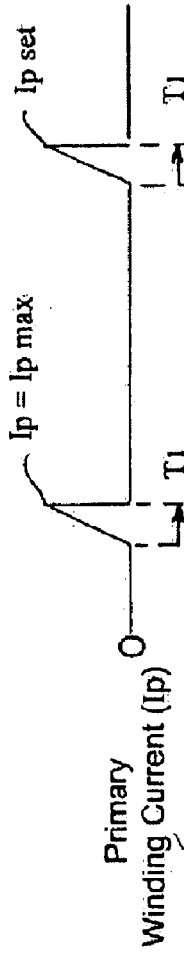
FIGS. 2a–2c are waveform diagrams showing respective enlarged voltage and current waveforms for each portion of the switching power supply circuit.
Figure 2B:
Figure 2C:
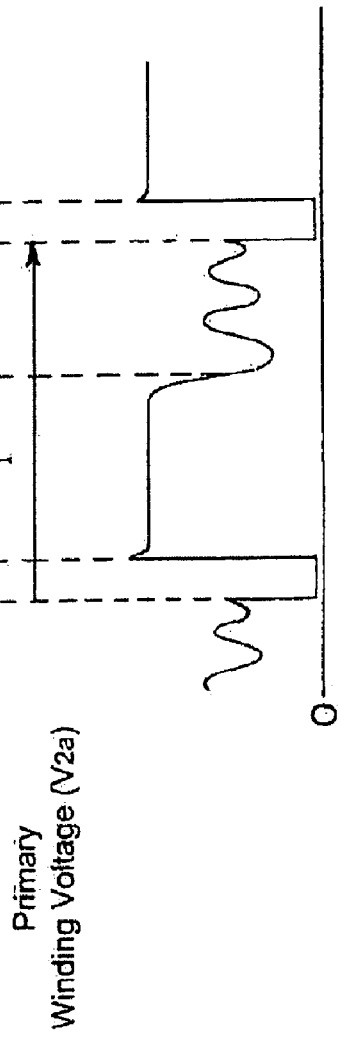

When discharge of electric energy stored in the secondary output winding 2b is completed as a result of the induced electromotive force, oscillation begins due to in-series resonance of stray capacity of the primary winding 2a and the switching device 3, and so on, with the primary winding 2a, as shown by a voltage $V_{2a}$ waveform of the primary winding 2a in FIG. 2c. This oscillation gradually reduces in magnitude.

The voltage generated in each winding falls, and once again, following an oscillation period T, the switching device 3 is switched on by the switching control circuit 5. Accordingly, the switching device 3 is switched on, and in this manner, a series of oscillation operations are repeated.

During these oscillations, an output current $I_{2o}$ output from the rectifying smoothing circuits 4 and 13 can be expressed by an average value of a secondary winding current Is that flows in the secondary output winding 2b during the oscillation period T and expressed as follows:

Equation $$I_{2o} = Is_{max} \times T2 \div T \div 2 \qquad (4)$$

where, $Is_{max}$ is a peak current generated in the secondary output winding 2b, T2 is an output time during which output is generated in the rectifying smoothing circuits 4 and 13 within oscillation period T, namely, a time for which output current flows in the secondary output winding 2b (refer to FIG. 2b.

Further, if a number of turns of the primary winding 2a is taken as Np, and a number of turns of the secondary output winding as Ns, the relationship of the primary winding current Ip and the secondary winding current Is is expressed by:

Equation $$Np \times Ip = Ns \times Is \qquad (5)$$

Moreover, based on Equation (5), if the peak current generated in the primary winding 2a is taken as $Ip_{max}$, the following equation can be derived:

Equation $$Is_{max} = Ip_{max} \times Np \div Ns \qquad (6)$$

In addition, if the ON time of the oscillating switching device 3 that excites the primary winding 2a is taken as T1; and an OFF adjustment time as T3; the oscillation period T, as shown in FIGS. 2a–2c, is expressed by:
Equation $$T = T1 + T2 + T3 \quad (7)$$

Accordingly, if Equations (6) and (7) are substituted into Equation (4), the following relationship can be derived:
Equation $$T3 = T2 \times (Np \div Ns \times Ip_{max} \div 2 \div I_{2o} - 1) - T1 \quad (8)$$

In this case, the primary winding current Ip increases in a manner that is substantially proportional to the elapse of the ON time T1. Accordingly, if the ON time T1 is set to a fixed value, the peak current $Ip_{max}$ of the primary winding at this time is fixed at a reference peak current $Ip_{ref}$ that is a constant. Further, Np and Ns are constants determined by circuit elements. Thus, if the output time T2 is detected and this value substituted into Equation (8), it is possible to obtain a selected output current $I_{2o}$ for the rectifying smoothing circuits 4 and 13, by adjustment of the OFF adjustment time T3.

Here, according to this embodiment, the output current $I_{2o}$ of Equation (8) is set to a set output current $I_{2oset}$ that executes constant current output control, and the OFF adjustment time T3 is derived from:
Equation $$T3 = T2 \times (Np \div Ns \times Ip_{ref} \div 2 \div I_{2oset} - 1) - T1 \quad (1)$$

The length of the OFF adjustment time T3 is adjusted so as to become equal to the OFF adjustment time T3 derived from Equation (1).

The OFF adjustment time T3 is adjusted by controlling the switching device 3 to switch on, in order to execute the subsequent oscillation, once the secondary winding current Is has been interrupted, namely, once the OFF adjustment time T3 that satisfies Equation (1) has elapsed following elapse of the output time T2.

Following this, the output current $I_{2o}$ of the rectifying smoothing circuits 4 and 13 is normally output at the set output current $I_{2oset}$ by repeating the utilized method, and thus it is possible to execute constant current output control.

In the switching power current circuit 50, the primary winding current Ip is detected by imputing a voltage drop $V_{ip}$ of the Ip detection resistor 22 from the analog input terminal Id of the A/D converter 5c. This voltage drop $V_{ip}$ is caused by flow of the primary winding current Ip. Voltage conversion is executed in this manner because it is possible to execute calculation processing of the voltage drop $V_{ip}$ (which is expressed by multiplying a resistance value $r_{ip}$ of the Ip detection resistor 22 by primary winding current Ip) that is taken as the converted value of the primary winding current Ip, using the calculation circuit 5a. Furthermore, detection of the voltage drop $V_{ip}$ is easier than detection of the primary winding current Ip.

According to this embodiment, the primary winding peak current $Ip_{max}$ is set to the reference peak current $Ip_{ref}$ which is a specific value. When the voltage drop $V_{ip}$ input from the analog input terminal Id reaches a peak electrical potential $V_{imax}$, which is a multiple of the reference peak current $Ip_{ref}$ and the resistance value $r_{ip}$ of the Ip detection resistor 22, an OFF control signal for switching the switching device 3 to OFF is output from the D/A converter 5b.

Figure 3:
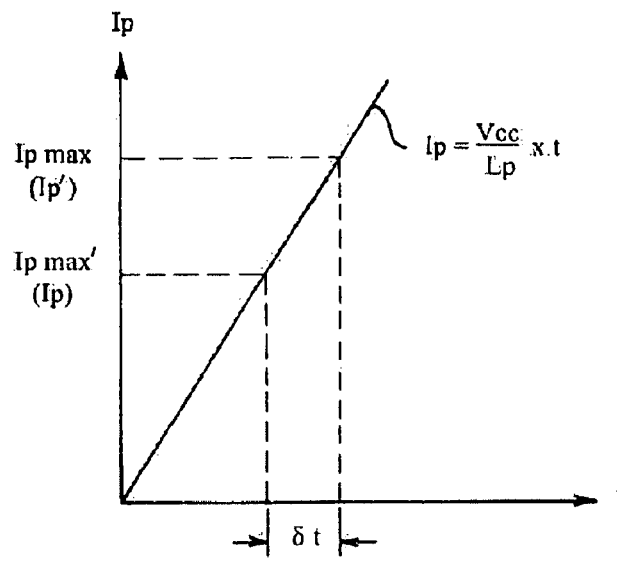

The primary winding current Ip, as shown by FIG. 3, is substantially proportional to an elapsed time t, following switching on of the switching device 3. Accordingly, by setting the reference peak current $Ip_{ref}$ to a constant as described above, the ON time T1 of the switching device 3 also becomes a fixed period. This fixed period ON time TI is derived based on the elapsed time from when the ON control signal is output to the switching device 3, until when the primary winding current Ip reaches the reference peak current $Ip_{ref}$ and the OFF control signal is output, as described above.

Detection of the output time T2 is easily achieved by estimating the time for which current flows in the diode 4 of the secondary side of the transformer 2. In this case, constant current output control is executed using only the primary side circuit of the transformer 2. Accordingly, the analog input terminal Vd of the A/D converter 5c is connected to a low voltage side end portion of the primary winding 2a via the resistor 23, such that the output time T2 is detected by monitoring the voltage ($V_{2a}$) of the primary winding 2a.

As shown in FIGS. 2a–2c, the output time T2 during which output is generated in the secondary output winding 2b is the discharge time of the energy stored in the transformer 2. This output time T2 is equal to the time from when the oscillating switching device 3 is switched off, until the time when the polarities of both terminals of the primary winding 2a switch due to the flyback voltage generated in the primary winding 2a reducing and free oscillation beginning.

Accordingly, the calculation circuit 5a of the switching control circuit 5 detects the output time T2 based on the time from when the D/A converter 5b outputs the OFF control signal for switching the switching device 3 to OFF, until when the potential with respect to the applied voltage of the primary winding voltage $V_{2a}$ waveform of the primary winding 2a first switches, following the reversal in polarity of the primary winding 2a. When free oscillation occurs, the time until the primary winding voltage $V_{2a}$ waveform reaches its initial smallest value approximates to the time taken for the first reversal of the potential with respect to the applied voltage of the primary winding 2a. Accordingly, the output time T2 may also be detected based on a time that is estimated from the time that elapses from the output of the OFF control signal until when the initial smallest value is reached.

The calculation circuit 5a of the switching control circuit 5 substitutes into Equation 1 the ON time T1 and the output time T2 detected by the above method, and each of the constants, namely, the set output current $I_{2oset}$ for executing constant current output control, the reference peak current $Ip_{ref}$ the number of turns Np of the primary winding 2a, and the number of turns Ns of the secondary output winding 2b, and then calculates the OFF adjustment time T3.

In addition, the OFF time of the switching device 3 is set so as to become equal to the sum of the output time T2 and the OFF adjustment time T3, namely, so that the ON control signal is output to the switching device 3 for the next oscillation when the calculated OFF adjustment time T3 has elapsed following the elapse of the output time T2, after the OFF control signal has been output.

The output current $I_{2o}$ of the rectifying smoothing circuits 4 and 13 during the oscillation period T becomes a set output current $I_{2oset}$ and the constant current output control is executed though repetition of this method.

According to an embodiment, the constant current output control is executed through adjustment of the OFF control time T3. Accordingly, the oscillation period T within the control period changes depending on the occasion. However, with a fixed oscillation period $T_c$, it is also possible to execute the constant current output control at a selected set output current $I_{2oset}$. Hereinafter, another embodiment will be explained in which the constant current output control is executed during this fixed oscillation period $T_c$.

As explained with regard to the previous embodiment, the output current $I_{2o}$ that is output from the rectifying smoothing circuits 4 and 13 can be expressed with Equation (4') below based on Equation (4), where the peak current generated in the secondary output winding 2b is taken as $Is_{max}$, the output time as T2, and the fixed oscillation time as $T_c$:

Equation $$I_{2o}=Is_{max} \times T2 \div T_c \div 2 \qquad (4')$$

By substituting Equation (6) that indicates the relationship between the secondary winding peak current $Is_{max}$ and the primary winding peak current $Ip_{max}$ into Equation (4'), and expanding the equation for the primary winding peak current $Ip_{max}$, the following relationship can be obtained:

Equation $$Ip_{max}=2 \times Ns \div Np \times 1_{2o} \times T_c \div T2 \qquad (9)$$

where,

Ns, Np are constants determined by circuit elements, $T_c$ is the fixed oscillation period.

Accordingly, the output time T2 is detected, and if this value is substituted into Equation (9), the selected output current $I_{2o}$ that is output form the rectifying smoothing circuits 4 and 13 by adjusting the primary winding peak current $Ip_{max}$ can be obtained.

According to this embodiment, the output current $I_{2o}$ of Equation (9) is set to the set output current $I_{2oset}$ of the rectifying smoothing circuits 4 and 13 for which the constant current output control is to be executed, and control is executed such that the primary winding peak current $Ip_{max}$ agrees with a set current value $Ip_{set}$ obtained from Equation (2) below:

Equation $$Ip_{set}=2 \times Ns \div Np \times 1_{2oset} \times T_c \div T2 \qquad (2)$$

The primary winding current Ip increases in a manner that is substantially proportional to the elapse of the time t following switching on of the oscillating switching device 3. Accordingly, by switching the switching device 3 to OFF when the increasing primary winding current Ip reaches the set current value $Ip_{set}$, the primary winding current Ip is made to agree with the set current value $Ip_{set}$.

This control detects the output time T2 within the oscillation period $T_c$ prior to the oscillation period $T_c$ for which constant current output control is to be executed; obtains the set current value $Ip_{set}$ from Equation (2) prior to the oscillation period $T_c$ for which control is to be executed; and executes control such that the switching device 3 is switched to OFF following the elapse of the ON time T1 after the primary winding current Ip has reached the set current value $Ip_{set}$ following the oscillating switching device 3 being switched to ON.

Hereinafter, the constant current output control can be executed by repeating this method, in which the output current $I_{2o}$ of the rectifying smoothing circuits 4 and 13 normally becomes equal to the set output current $I_{2oset}$.

The constant current output control according to the second embodiment can be executed using a circuit having the same structure as the switching power supply circuit 50 according to the first embodiment. Accordingly, explanation will be omitted here concerning the method of detecting the primary winding current Ip and expressing it as the voltage-converted voltage drop $V_{ip}$, and the method of detecting of the output time T2.

The calculation circuit 5a of the switching control circuit 5 substitutes the detected output time T2 into Equation (2), calculates the set current value $Ip_{set}$. A set potential $V_{iset}$ is set by multiplying the set current $Ip_{set}$ by the resistance value $r_{ip}$ of the Ip detection resistor 22 so as to compare the set current value $Ip_{set}$ with the voltage drop $V_{ip}$ input from the analog input terminal 1d at the same amplification.

After the ON control signal is output to the switching device 3 from a Vg terminal of the D/A converter 5b, the voltage drop $V_{ip}$ input from the Id terminal of the A/D converter 5c increases along with the elapse of the time t. When it is determined that the voltage drop $V_{ip}$ has reached the set potential $V_{iset}$ for comparison, the OFF control signal for switching the switching device 3 to OFF is output from the Vg terminal.

The output current $I_{2o}$ of the rectifying smoothing circuits 4 and 13 during the oscillation period $T_c$ in which the ON time T1 is regulated in this way becomes the set output current $I_{2oset}$, and the constant current output control is executed by repetition of this method.

In the two embodiments described above, delay which is natural to the circuit elements, such as the A/D converter 5c, the calculation circuit 5a, the D/A converter 5b, and the switching device 3, is generated between the time when there is input of the voltage drop $V_{ip}$ that indicates the primary winding current Ip from the analog input terminal Id of the A/D converter 5c, and the time when it is determined that the voltage drop $V_{ip}$ is equal to or has exceeded the peak potential $V_{imax}$ or the set potential $V_{iset}$, after which the switching device 3 is actually switched to OFF.

On the other hand, if the voltage of the primary winding 2a is taken as $V_{2a}$, an inductance of the primary winding 2a as Lp, and an elapsed time as t, the primary winding current Ip is expressed by:

Equation $$Ip=V_{2a} \div Lp \times t \qquad (10)$$

The primary winding current Ip increases in proportion to the amount of voltage applied to the primary winding 2a after the switching device 3 is switched off.

As a result, as shown in FIG. 3, when the switching device 3 is switched to OFF, the current Ip that actually flows within the primary coil 2a increases more than the primary winding current Ip when the potential $V_{ip}$ is determined to have reached the peak potential $V_{imax}$ or the set potential $V_{iset}$. If the sum of the characteristic delays resulting from the aforementioned circuit elements is taken as $\delta t$, based on Equation (10), an increase portion $\delta Ip$ is:

Equation $$\delta Ip=V_{2a} \div Lp \times \delta t \qquad (11)$$

Here, if other voltage drop elements resulting from exciting currents flowing in the circuit are ignored with respect to the voltage drop $V_{2a}$ applied to the primary winding 2a during the period when the switching device 3 is ON, the voltage $V_{2a}$ can be replaced with a power supply voltage Vcc of the direct current power supply 1. If the increase portion of Equation (11) is considered, a current Ip' can be derived as follows:

Equation $$Ip'=Ip+\delta t \times Vcc \div Lp \qquad (3)$$

This current Ip' is compared with the reference peak current $Ip_{ref}$ or the set current value $Ip_{set}$, and thus it is possible to switch off the switching device 3 in accordance with the timing of the actual flow of the reference peak current $Ip_{ref}$ or the set current value $Ip_{set}$.

According to an embodiment, the voltage drop $V_{ip}$ that has been converted to a voltage from primary winding current Ip, and the peak potential $V_{imax}$ that has been converted to a voltage from the reference peak current $Ip_{ref}$ are compared. Accordingly, the voltage drop is taken as $V_{ip}$ and both sides of Equation (3) are multiplied by the resistance value $r_{ip}$ as in Equation (12) below, and the voltage drop $V_{ip}'$ obtained is compared with the peak potential $V_{imax}$.

Equation $$V_{ip}'=V_{ip}+\delta t\times Vcc\div Lp\times r_{ip} \qquad (12)$$

Further, according to another embodiment, the voltage drop $V_{ip}'$ of Equation (12) is compared to the set potential $V_{iset}$.

Figure 4:
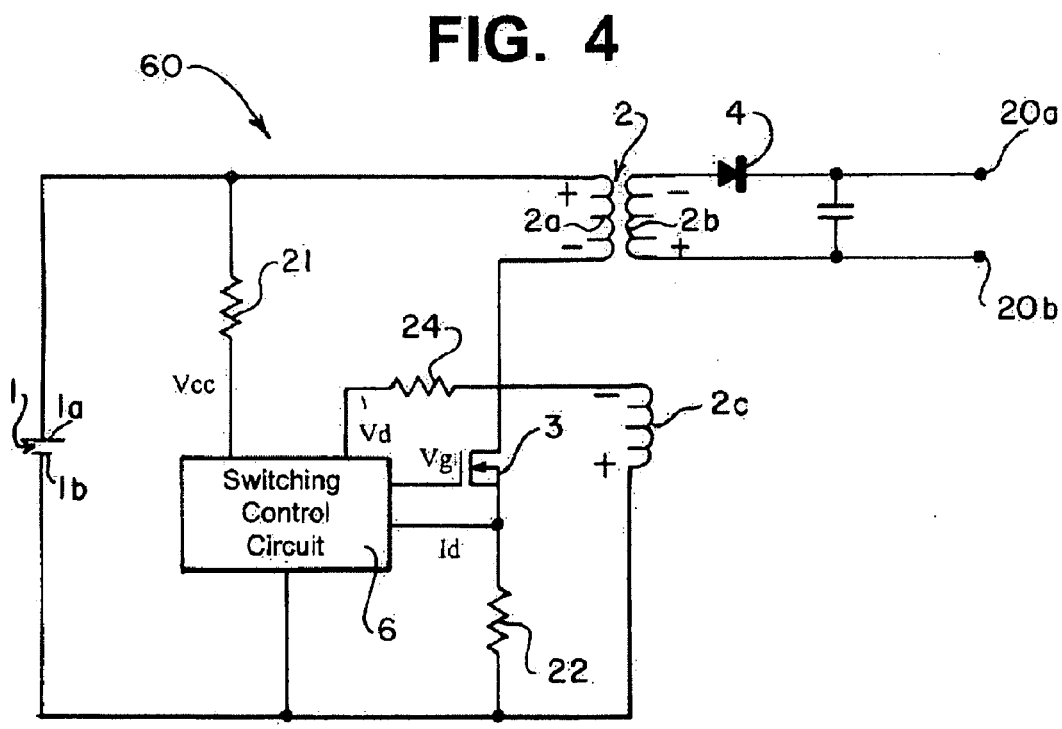
FIG. 4 is a circuit diagram of a switching power supply circuit 60 according to another embodiment of the present invention.

FIG. 4 is a circuit diagram of a switching power supply circuit 60 according to a third embodiment of the present invention. Switching power supply circuit 60 is provided with an auxiliary winding 2c at the primary side of the transformer 2, and monitors a voltage $V_{2c}$ of the auxiliary winding $2_c$ to detect an output time T2.

The switching power supply circuit 60, as compared to the switching power supply circuit 50 shown in FIG. 1, only differs with respect to the fact that the auxiliary winding 2c is additionally provided in the transformer 2, and the analog input terminal Vd of the A/D converter of the switching control circuit 6 is connected to a low voltage side end portion of the auxiliary winding 2c via the resistor 24.

The voltage $V_{2c}$ generated in the auxiliary winding 2c of the transformer 2 is proportional to the voltage $V_{2a}$ of the primary winding 2a by a rating of the number of turns. Accordingly, once the switching device 3 is switched to OFF, the time T2 until the polarity of auxiliary winding 2c reverses is equal to the time T2 taken for the polarity of the primary winding 2a to reverse. The voltage $V_{2c}$ of the auxiliary winding 2c is connected and input from the analog input terminal Vd of the A/D converter, and the time T2 is detected by the calculation circuit within the switching control circuit 6. With regard to other structure, the next embodiment is the same as the prior embodiments and thus explanation will be omitted here.

Figure 5A:
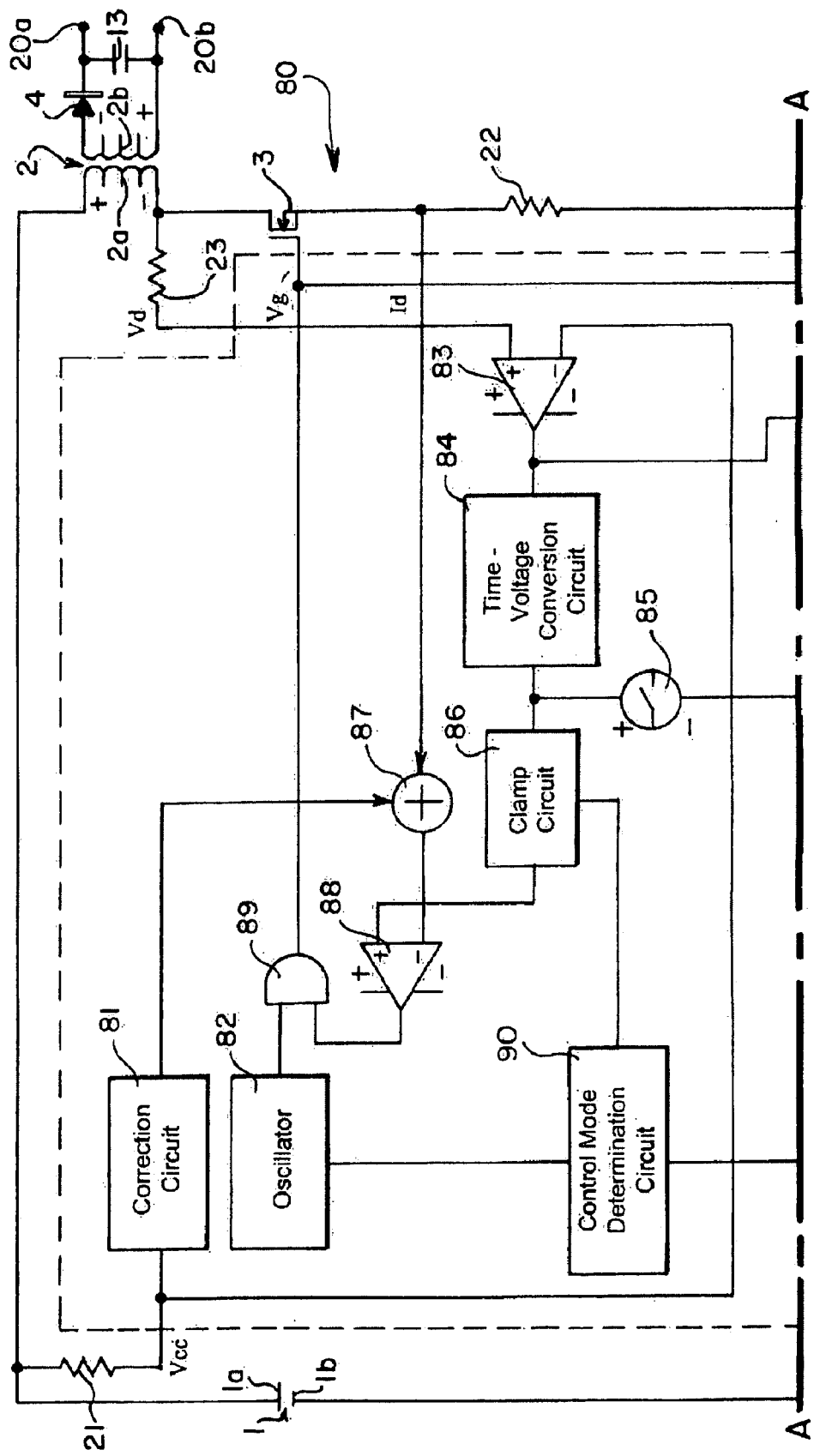
FIGS. 5a–5b is a circuit diagram showing a constant current output control device according to another embodiment of the present invention.
Figure 5B:
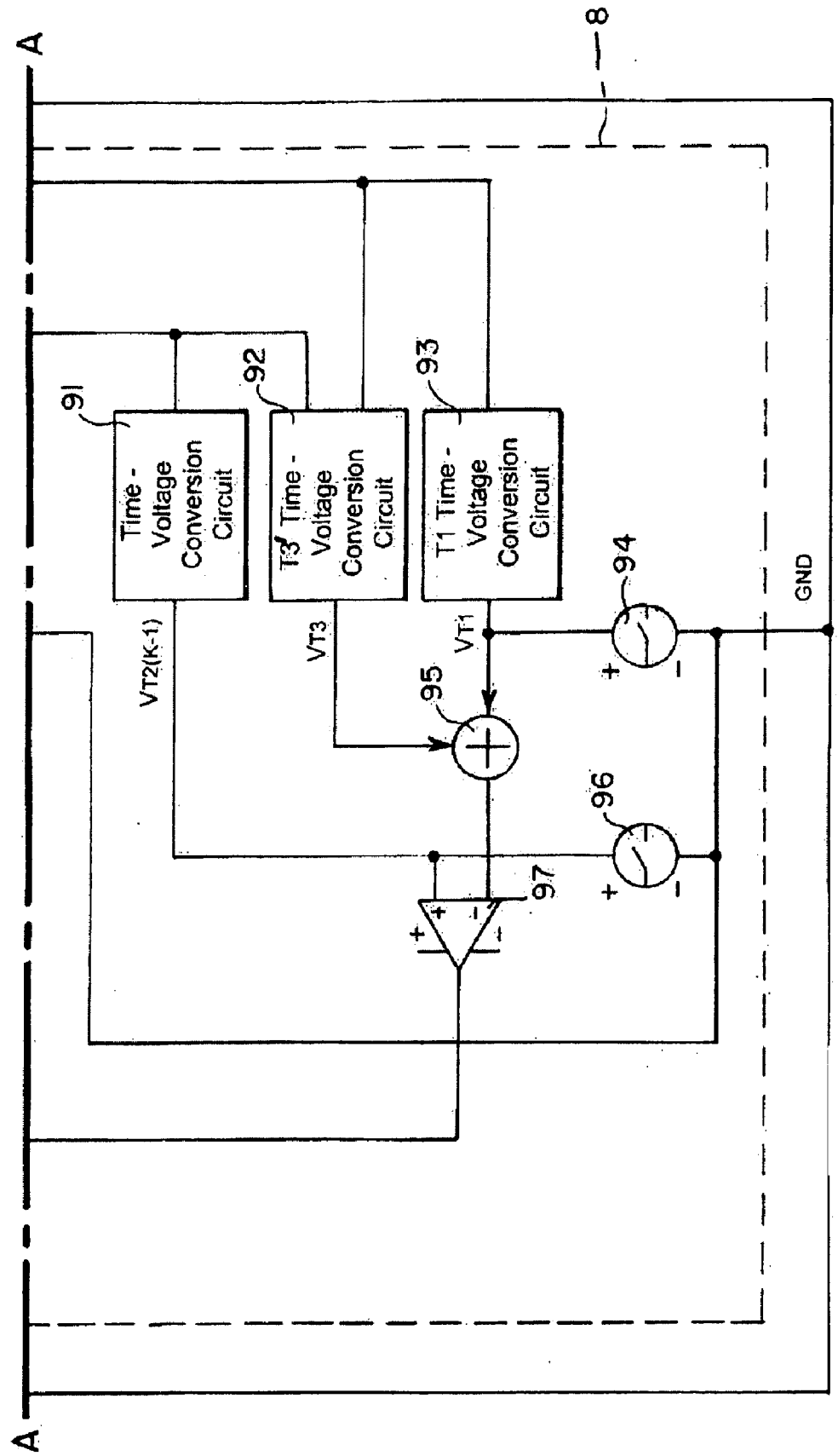

FIGS. 5a–5b are circuit diagrams showing a constant current output control device 8 (hereinafter referred to as "switching control circuit 8") of a switching power supply circuit 80 according to a further embodiment of the present invention.

According to this embodiment, the switching control circuit 8 operates as the constant current output control device and utilizes analog processing using a comparator circuit and a logic circuit, etc., to execute the digital calculation processing. The digital calculation processing is the same one as explained with regard to an embodiment, which executes the constant current output control on the calculation circuit 5a of the switching control circuit 5. Accordingly, the structure of the switching control circuit 8 that differs from those of the previously described embodiments will be explained in detail, while structure that is the same as that previously described will be denoted with the same reference numerals, and its explanation omitted.

Further, the switching control circuit 8 also functions as a constant voltage control device, and thus, the structure that is principally used for executing the constant voltage control, and an operation thereof, will be explained.

During an oscillation operation of the switching power supply 80, the peak current $Is_{max}$ generated in the secondary output winding 2b can be expressed as follows, if the output voltage of the secondary output winding 2b is taken as $V_{2b}$, and the inductance of the secondary output winding 2b is taken as Ls:

Equation $$Is_{max}=V_{2b}\div Ls\times T2 \qquad (13)$$

The relationship expressed by Equation (14) below can be obtained from Equations (13) and (6).

Equation $$Ip_{max}=V_{2b}\times Ns\div Np\div Ls\times T2 \qquad (14)$$

where,

Ns, Np and Ls are constants determined depending on circuit elements. Accordingly, the output time T2 is detected, and if this value is substituted into Equation (14), it is possible to obtain the selected output voltage $V_{2b}$ of the secondary output winding 2b, by adjusting the primary winding peak current $Ip_{max}$.

Meanwhile, the output voltage $V_{2b}$ of Equation (14) is set as the output voltage $V_{2bset}$ of the secondary output winding 2b for constant voltage control, and the ON time T1 is controlled such that the primary winding peak current $Ip_{max}$ agrees with the set current value $Ip_{set}$ obtained from Equation (15) below:

Equation $$Ip_{set}=V_{2bset}\times Ns\div Np\div Ls\times T2 \qquad (15)$$

The primary winding current Ip increases after the switching device 3 is switched on. Accordingly, by executing control such that the switching device 3 switches to OFF when the increasing primary winding current Ip reaches the set current value $Ip_{set}$, the primary winding peak current $Ip_{max}$ is made to agree with the set current value $Ip_{set}$. In this case as well, the primary winding current Ip is expressed by the voltage drop $V_{ip}$ that has been converted to a voltage. Therefore, when the voltage drop $V_{ip}$ reaches the set current $Vi_{set}$ that is a multiple of the set current value $Ip_{set}$ and the resistance value $r_{ip}$, the switching device 3 is switched off. By adjusting the ON time T1 in this way, the output voltage $V_{2b}$ of the secondary output winding 2b is normally output at the set value $V_{2bset}$, and it is possible to execute constant voltage control.

In order to execute this constant voltage control, the switching control circuit 8 of the switching power supply circuit 80 is provided with a delay correction circuit 81 that outputs a correction voltage; an oscillator 82 capable of outputting a timing clock having a period equal to the fixed oscillation period $T_c$ of the switching power supply circuit 80; a comparator 83; a time-voltage conversion circuit 84 that converts from the output time T2 to the set voltage $V_{iset}$; a sample and hold circuit 85; a clamp circuit 86; an adder 87 for adding the correction voltage output from the delay correction circuit 81 to the voltage drop $V_{ip}$; a comparator 88 for comparing the corrected voltage drop $V_{ip}$ with the set potential $V_{iset}$; and an AND gate 89.

Hereinafter, an operation of this constant voltage control of the switching control circuit 8 will be explained. First, the comparator 83 detects the output time T2 of the switching power supply circuit 80 while the oscillation operation. With regard to the comparator 83, the non-inverted input is connected to the low voltage side end portion of the primary winding 2a via the resistor 23 and the input terminal Vd, and is input with the divided voltage that is proportional to the primary winding voltage $V_{2a}$. However, for the inverted input, a divided voltage is input that is proportional to the direct current power supply 1 that makes possible detection of polarity reversal of the primary winding voltage $V_{2a}$. Thus, a waveform according with the polarity of the primary winding voltage $V_{2a}$ is output. Accordingly, the comparator 83 outputs the output waveform "H" due to the flyback voltage when the switching device 3 is switched to OFF, and then switches to "L" when the polarity reverses following completion of energy discharge of the transformer 2.

The time-voltage conversion circuit 84 takes the period during which the comparator 83 outputs "H" as the output time T2, derives the set current value $Ip_{set}$ from Equation (15), and then outputs the set potential $V_{iset}$, which is the multiple of the set current value $Ip_{set}$ and the resistance value $r_{ip}$. The set current value is multiplied by the resistance value $r_{ip}$ of the Ip detection resistor 22 in order to make a comparison with the voltage drop $V_{ip}$, which is the multiple of the primary winding current Ip and the resistance value $r_{ip}$, in the comparator 88.

The sample and hold circuit 85 maintains the set potential $V_{iset}$ until, at the least, the subsequent oscillation period for which constant voltage control is to be executed, and outputs the set potential $V_{iset}$ to the clamp circuit 86.

The clamp circuit 86 compares the set potential $V_{iset}$ output from the sample and hold circuit 85 with the peak potential $V_{imax}$ that is a fixed value for constant current output control, described hereinafter. In the case that the set potential $V_{iset}$ is less than or equal to the peak potential $V_{imax}$, the set potential $V_{iset}$ is clamped, and a pulse waveform having an amplitude that becomes the set potential $V_{iset}$ is output to the non-inverted input of the converter 88.

The current Ip that flows in the primary winding 2a during the oscillation operation, is input at one end of the adder 87 from the input terminal 1d as the voltage drop $V_{ip}$ from the Ip detection resistor 22, namely, the voltage drop $V_{ip}$ expressed by multiplying the current Ip with the resistance value $r_{ip}$.

The delay correction circuit 81 uses the sum δt of the characteristic delay times, measured by, e.g. a measuring circuit (not shown), resulting from the switching control circuit 8, the switching device 3, and the power supply voltage Vcc of the direct current power supply 1 input via the resistor 21, to calculate a correction voltage corresponding to the following section of Equation (12): δt×Vcc÷Lp× $r_{ip}$. This correction voltage is then input to the other side of the adder 87.

The adder 87 executes calculation processing in which the correction voltage is added to the voltage drop $V_{ip}$ of Equation (12), and then outputs the corrected voltage drop $V_{ip}$ to the inverted input of the comparator 88.

Accordingly, in the comparator 88, the corrected voltage drop $V_{ip}$ that accounts for the delay time of the circuit elements is compared with the set potential $V_{iset}$. In the case that the corrected voltage drop $V_{ip}$ is equal to or less than the set potential $V_{iset}$ "H" is output to the AND gate 89, whereas, in the case that the set potential $V_{iset}$ is exceeded, "L" is output to the AND gate 89.

Outputs from the oscillator 82 and the comparator 88 are input to the AND gate 89, and the AND gate 89 has its output connected to the gate of the switching device 3. Accordingly, the AND gate 89 operates so as to control the switching device 3 to be ON only during periods when the logical product is "H".

The oscillator 82 outputs a clock having a period equal to the fixed oscillation period $T_c$ during the fixed current output control. During periods when the clock output from the oscillator 82 is "L", the switching device 3 is controlled to be OFF, and exciting current does not flow in the primary winding 2a of the transformer 2.

When the clock output from the oscillator 82 switches to "H", and the output from the comparator 88 is also "H", namely, during the period when the voltage drop $V_{ip}$ has not reached the set potential $V_{iset}$, the output from the AND gate 89 also becomes "H", and thus the switching device 3 is switched on.

After this, the voltage drop $V_{iset}$ that indicates the primary winding current Ip also increases proportionally with respect to the ON time. When the voltage drop $V_{ip}$ exceeds the set potential $V_{iset}$, the output of the comparator 88 becomes "L". Accordingly, the output of the AND gate 89 also becomes "L", and the switching device 3 is switched to OFF. The voltage drop $V_{ip}$ at the time when the switching device 3 is switched to OFF is substantially equal to the set potential $V_{iset}$, and the current Ip that flows in the primary winding 2a at this time becomes equal to the set current value $Ip_{set}$ of Equation (15), and thus an output that is substantially equal to the set output voltage $V_{2b}$ can be obtained. By repeating this, at the least, during the oscillation operation, constant voltage control of the set output voltage $V_{2b}$ is executed at the secondary side of the transformer 2.

In order for the switching control circuit 8 of the switching power supply circuit 80 to execute the constant current output control, it is further provided with a control mode determination circuit 90; a time-voltage conversion circuit 91 that converts the output time T2 to a comparison time potential $V_{T2ref}$, described hereinafter; a T3' time-voltage conversion circuit 92 that converts an OFF elapsed time T3', which is an elapsed time since the output time T2 has elapsed, to an OFF time potential $V_{T3}$; a T1 time-voltage conversion circuit 93 for converting an ON time T1 to an ON time potential $V_{T1}$; an adder 95 that adds the OFF time potential $V_{T3}'$ to the ON time potential $V_{T1}$; sample and hold circuits 94 and 96; and a converter 97 to obtain the OFF adjustment time T3 of Equation (1). As a result of control by the control mode determination circuit 90, while the constant current output control mode, the oscillator 82 freely outputs a clock for which the OFF adjustment time T3 varies during each oscillation period T.

Equation (14) below expresses the relationship of the primary side peak current ($Ip_{max}$) and the secondary side voltage (secondary winding voltage $V_{2b}$):

Equation $$Ip_{max} = V_{2b} \times Ns \div Np \div Ls \times T2 \quad (14)$$

Based on Equation (14), when the output voltage (secondary winding voltage $V_{2b}$) during oscillation of the switching power supply circuit 80 drops, the output time T2 that is the energy discharge time becomes longer. Here, an upper limit of the primary winding peak current $Ip_{max}$ is taken as the reference peak current $Ip_{ref}$ that is a fixed value. Namely, when the set current value $Ip_{set}$, which is obtained from Equation (15) below based on the detected output time T2, enters a region that is equal to or above the reference peak current $Ip_{ref}$, the primary winding peak current $Ip_{max}$ is set to the reference peak current $Ip_{ref}$.

Equation $$Ip_{set} = V_{2bset} \times Ns \div Np \div Ls \times T2 \quad (15)$$

Oscillation is then generated during the limited output time T2. A constant current output control mode is thus defined in which the primary winding peak current $Ip_{max}$ and the secondary winding peak current $Is_{max}$, which tend to increase within the region, are controlled to a constant current.

Meanwhile, in the case that the set current value $Ip_{set}$ derived with Equation (15) from the detected output time T2 has not reached the reference peak current $Ip_{ref}$, it is determined that the secondary winding voltage $V_{2b}$ has exceeded the set value $V_{2bset}$ and tends to increase within the region; this mode is determined to be a constant voltage control mode, and the constant voltage control described above is executed.

The switching control circuit 8 executes determination of the constant current output control or the constant voltage control by comparing the set potential $V_{iset}$, which is a multiple of the set current value $Ip_{set}$ and the resistance value $r_{ip}$, with the peak potential $V_{imax}$, which is a multiple of the reference peak current $Ip_{ref}$ and the resistance value $r_{ip}$ in the clamp circuit 86.

In the clamp circuit 86, in the case that the set potential $V_{iset}$ is equal to or less than the peak potential $V_{imax}$, the constant voltage control described above is executed. In the case that peak potential $V_{imax}$ is exceeded, the constant current output control is executed by outputting a constant current mode signal to the control mode determination circuit 90, and along with this, outputting a pulse waveform having an amplitude that becomes the peak potential $V_{imax}$ to the non-inverted input of the converter 88.

So long as the control mode determination circuit 90 does not receive the constant current mode signal from the clamp circuit 86, it determines the mode as the constant voltage control mode. The output from the comparator 97 is interrupted and a clock is output from the oscillator 82 with a period equal to the fixed oscillation period $T_c$. Further, in the case that the fixed current mode signal is received, the constant current output control mode is determined, and the output from the comparator 97 is made effective and output to the oscillator 82.

The input of the T2 time-voltage conversion circuit 91 is connected to the output of the comparator 83. The period for which the "H" is input from the comparator 83 is taken as the output time T2, and the comparison time potential $V_{T2ref}$, which is converted into voltage from the comparison time $T2_{ref}$ that is the multiple of the output time T2 and (k−1), is output. Here, k is a constant corresponding to Np÷Ns× $Ip_{ref} \div 2 \div I_{2oset}$ in the following equation:

Equation $$T3 = T2 \times (Np \div Ns \times Ip_{ref} \div 2 \div I_{2oset} - 1) - T1 \tag{1}$$

Accordingly, the comparison time potential $V_{T2ref}$ expresses the voltage converted value of $T2 \times (Np \div Ns \times Ip_{ref} \div 2 \div I_{2oset} - 1)$.

The comparison time potential $V_{T2ref}$ output from the T2 time-voltage conversion circuit 91 is maintained until the subsequent oscillation period for which the constant current output control is to be executed, and output to the non-inverted input of the comparator 97.

The T3' time-voltage conversion circuit 92 is provided with a counter and has an input that is connected to the Vg terminal connected to the switching device 3, and to the output of the comparator 83. When the Vg terminal becomes "H", namely, when the switching device 3 is switched on, counting is terminated, and along with this, the count value is reset. When the output of the comparator 83 switches from "H" to "L", counting is initiated. Accordingly, the count value of the counter indicates the OFF elapsed time T3' during which the switching device 3 is OFF after the output time T2 has elapsed. The T3' time-voltage conversion circuit 92 periodically coverts the count value that gradually increases with the elapse of time to the voltage-converted OFF time potential $V_{T3}$ and output to the adder 95. The cycle of this periodic comparison is substantially smaller than the oscillation cycle T.

The T1 time-voltage conversion circuit 93 is connected to the Vg terminal connected to the switching device 3. The period for which the Vg terminal is "H" is taken as the ON time T1, and the detected ON time T1 is voltage-converted to the ON time potential $V_{T1}$ and output to the other input of the adder 95.

The ON time potential $V_{T1}$ is maintained by the sample and hold circuit 94 until there is a new input, namely, until a new ON time potential $V_{T1}$ is output form the T1 time-voltage conversion circuit 93, and then the ON time potential $V_{T1}$ is output to the other input of the adder 95.

The comparator 97 compares the totaled value of the ON time potential $V_{T1}$ and the OFF time potential $V_{T3'}$ with the comparison time potential $V_{T2ref}$. To do so, essentially, the OFF elapsed time T3' that gradually increases is substituted into the left hand side of Equation (1) in order to obtain the OFF adjustment time T3 that satisfies Equation (1).

In other words, during each oscillation period T, the OFF time potential $V_{T3'}$, when the output time T2 has elapsed is "0", since the count value of the T3' time-voltage conversion circuit 92 is reset. Following this, the output of the comparator 97 is maintained at "H" until the total value of the OFF time potential $V_{T1}$ and the OFF time potential $V_{T3'}$, which gradually increases with time, reaches the comparison time potential $V_{T2ref}$.

When the total value of the OFF time potential $V_{T1}$ and the OFF time potential $V_{T3'}$ reaches the comparison time potential $V_{T2ref}$, the output of the comparator 97 switches from "H" to "L". At this time, the OFF elapsed time T3' that has been converted to the OFF time potential $V_{T3'}$ becomes the OFF adjustment time T3 that satisfies Equation (1).

While the control mode determination circuit 90 connected to the output of the comparator 97 determines the mode as the constant current output control mode based on the constant current mode signal, the output from the comparator 97 is output as is to the oscillator 82. Accordingly, when the OFF elapsed time T3' becomes the OFF adjustment time T3 that satisfies Equation (1), the output to the oscillator 82 switches from "H" to "L".

The oscillator 82 takes the "L" input as a trigger signal for outputting the clock of one oscillation cycle T, and outputs an "H" pulse to the AND gate 89. During the OFF control period, current is not flowing in the primary winding Ip, and thus the output of the comparator 88 that is the other input of the AND gate 89 becomes "H". As a result, the AND gate 89 executes control such that the switching device 3 switches to ON, and the oscillation of the next oscillation period T starts. In other words, the OFF adjustment time T3 of the oscillation cycle T immediately prior to the start of this oscillation satisfies Equation (1) derived from the output time T2. Thus, the set output current $I_{2oset}$ is output as the set output current of the rectifying smoothing circuit 4, 13, and it is possible to execute the constant current output control.

In the constant current output control mode, the time for which the clock signal "H" is output from the oscillator 82 is significantly longer than the ON time T1 from when the switching device 3 is switched on to when the switching device 3 is switched off by the reference peak current $Ip_{ref}$ that is the upper limit of the primary winding peak current $Ip_{max}$. Accordingly, the output of the AND gate 89 switches to "L", and the timing of switching off of the switching device 3 accords with when the output of the comparator 88 switches from "H" to "L". More particularly, the timing accords with when the voltage drop $V_{ip}$ that indicates the primary winding current Ip reaches the peak potential $V_{imax}$ that is the multiple of the reference peak current $Ip_{ref}$ and the resistance valve $r_{ip}$.

Moreover, in the switching control circuit 8 according to this embodiment as well, $\delta t \times Vcc \div Lp \times r_{ip}$ that corresponds to the delay resulting from the circuit elements is added to the voltage drop $V_{ip}$ that indicates the primary winding current Ip by the adder 87. Comparison is made with the set potential $V_{iset}$ or the peak potential $V_{imax}$, and in actuality, when the set current value $Ip_{set}$ or the reference peak current $Ip_{ref}$ obtained from Equation (15) is flowing, it is possible to execute control such that the switching device 3 is switched to OFF.

Figure 6:
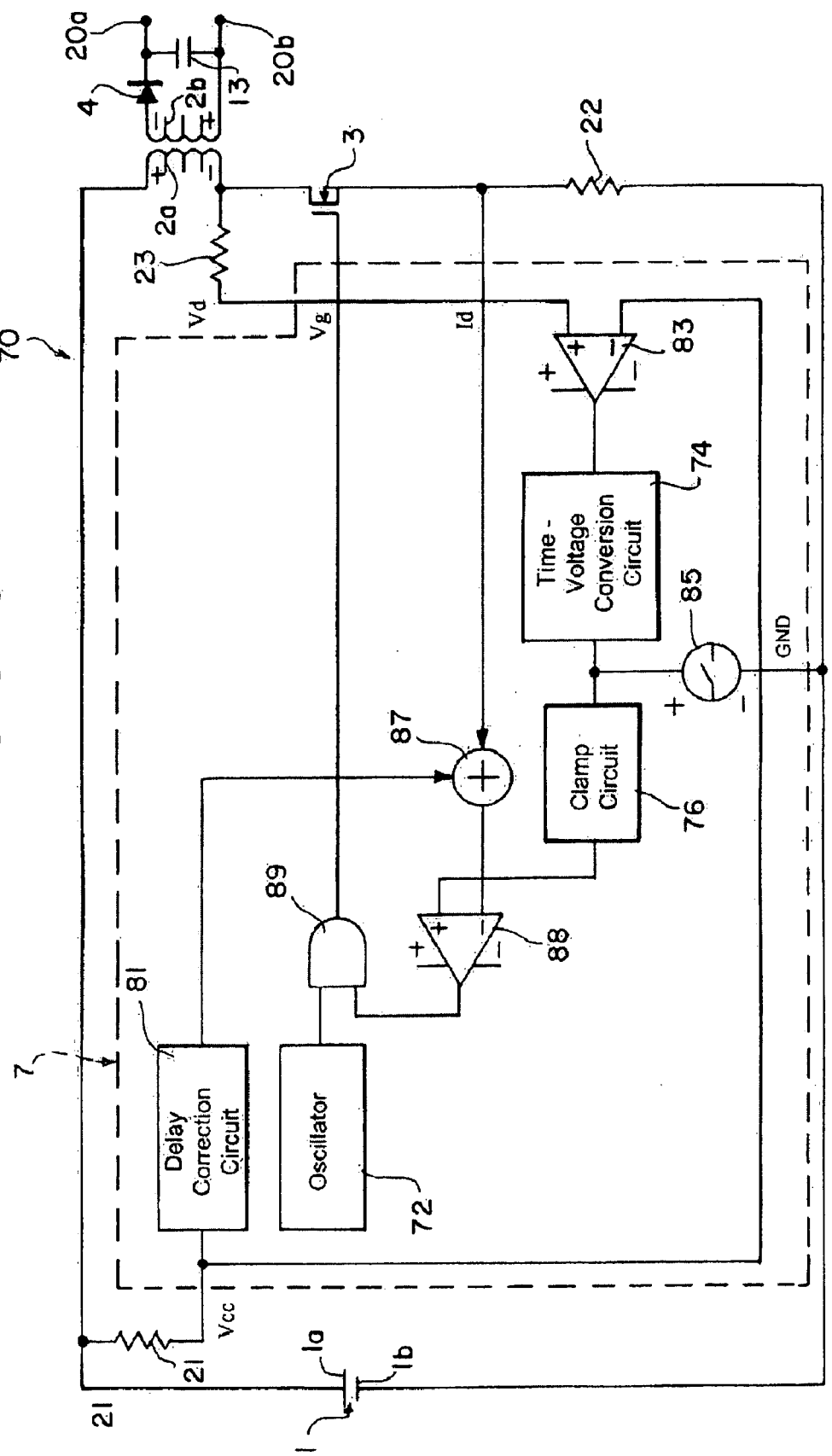
FIG. 6 is a circuit diagram showing a, constant current output control device according to another embodiment of the present invention.

FIG. 6 is a circuit diagram showing a constant current output control device 7 (hereinafter referred to as "switching control circuit 7") of a switching power supply circuit 70 according to a fifth embodiment of the present invention.

In this embodiment, the digital processing executed by the calculation circuit 5a of the switching control circuit 5, which was explained with reference to the second embodiment, is executed by the switching control circuit 7 that operates as a constant current output control device using analog processing that utilizes a comparator circuit and a logic circuit, etc.

A comparison of FIGS. 5a–5b and FIG. 6 illustrates, the structure of the switching control circuit 7 according to this embodiment is substantially the same as the structure for constant voltage output control of the switching control circuit 8 according to a previous embodiment. Accordingly, structure of the aforementioned switching power supply circuit 70 that is the same as that of the switching control circuit 8 will be denoted with the same reference numerals, and its explanation omitted. In other words, with the switching power supply circuit 70 according to this embodiment, it is possible to realize both the constant voltage control and the constant current output control, through only slight modifications of the structure of the switching control circuit 7.

In FIG. 6, an oscillator 72 outputs a clock with a period equal to the fixed oscillation period $T_c$; a time-voltage conversion circuit 74 converts the output time T2 to the set potential $V_{iset}$; and a clamp circuit 76 outputs a voltage waveform of the set potential $V_{iset}$.

Hereinafter, a constant current output control operation of the switching control circuit 7 will be explained. First, during the oscillation operation, the comparator 83 outputs "H" during the output time T2. The time-voltage conversion circuit 74 obtains the set current value $Ip_{set}$ from the output time 12 and Equation (2), and outputs the set potential $V_{iset}$ that is the multiple of the set current value $Ip_{set}$ and the resistance value $r_{ip}$.

The sample and hold circuit 85 maintains the set potential $V_{iset}$ until, at the least, the subsequent oscillation period for which the constant current output control is to be executed, and outputs the set potential $V_{iset}$ to the clamp circuit 76.

The clamp circuit 76 clamps the set potential $V_{iset}$ output from the sample and hold circuit 85, and outputs a pulse waveform having an amplitude that becomes the set potential $V_{iset}$ to the non-inverted input of the comparator 88.

The voltage drop $V_{ip}$ from the Ip detection resistor 22, namely, the voltage drop $V_{ip}$ indicating $Ip \times rip$ is input to one end of the adder 87. Moreover, the correction voltage, which value is $\delta t \times Vcc \div Lp \times r_{ip}$ of Equation (12), that is output from the delay correction circuit 81 is input to the other end of the adder 87. Once the calculation processing of Equation (12) is executed by the adder 87, the corrected voltage drop $V_{ip}$ is output to the inverted input of the comparator 88.

The comparator 88 compares this voltage drop $V_{ip}$ that accounts for the delay times of the circuit elements with the set potential $V_{iset}$, and in the case that the corrected voltage drop $V_{ip}$ is equal to or below the set potential $V_{iset}$, "H" is output to the AND gate 89. Meanwhile, in the case that the corrected voltage drop $V_{ip}$ exceed the set potential $V_{iset}$, "L" is output to the AND gate 89.

When the clock output from the oscillator 72 turns "H", the output from the comparator 88 is also "H" since the voltage drop $V_{ip}$ has not reached the set potential $V_{iset}$. Thus, the output of the AND gate 89 becomes "H", and the switching device 3 is switched on.

Following this, the voltage drop $V_{ip}$ that indicates the primary winding current Ip, which increases proportionally with the elapse of the ON time, also increases, and when the voltage drop $V_{ip}$ exceeds the set potential $V_{iset}$, the output of the comparator 88 becomes "L". Accordingly, the output of the AND gate 89 also becomes "L", and the switching device 3 is switched to OFF. The voltage drop $V_{ip}$ at the time when the switching device 3 is switched to OFF is equal to the set potential $V_{iset}$. At this time, the current Ip that flows in the primary winding 2a becomes $Ip_{set}$ of Equation (2), and the current of set output current $I_{2oset}$ is output from the rectifying smoothing circuits 4 and 13.

In addition, by repeating this control, at the least, during the oscillation operation, it is possible to execute constant current output control of the set output current $I_{2oset}$ that is set for the output of the rectifying smoothing circuits 4 and 13.

In the fifth embodiment described above, the output time T2 until when stable oscillation operation of the entire switching power supply circuit occurs is unstable, and thus it is not possible to set the set current $Ip_{set}$. Accordingly, it is preferable that the set current $Ip_{set}$ be given a fixed value and that the ON time T1 be set to be a constant in advance, until stable operation occurs.

It should be noted that, it is not necessary to detect the output time T2 for each period $T_c$. For example, the constant current output control may be performed by executing a detection every time a period elapses that is longer than the oscillation period $T_c$.

Further, according to the present invention, it is possible to execute constant current output control in which the value of an output current is reduced when this output current exceeds a set output current $I_{2oset}$. Furthermore, in addition to this, it is possible to execute constant current output control of a value of an output current $I_{2o}$ that is set for a rectifying smoothing circuit. Accordingly, the present invention may be applied to and can be adopted as a switching power supply circuit, such as the conventional switching power supply circuit provided with the transformer 2 that was explained previously. Such a switching power supply circuit is provided with an output detection circuit at a secondary side of a transformer, and a feedback circuit that transmits a detection signal of the detection circuit to an insulated signal transmission element, such as a photo coupler.

Further, under the Equation (1), the ON time T1 and the reference peak current $Ip_{ref}$ have a relationship such that if either one of them is set as a fixed constant, the other value also becomes a constant. Accordingly, it is possible to set just one of the ON time T1 and the reference peak current $Ip_{ref}$ to a constant. In the first or fourth embodiments described above, the reference peak current $Ip_{ref}$ was set to a fixed value, and then the ON time T1 at this time was obtained by measurement. However, the reference peak current $Ip_{ref}$ may be obtained by setting the On time T1 to a specified fixed time, and then detecting the primary winding current Ip flowing in the primary winding 2a when this ON time T1 has completely elapsed.

What is claimed is:

1. A constant current output control method for a switching power supply circuit having a transformer provided with a primary winding and a secondary output winding; an oscillating switching device connected in-series with the primary winding to connect the primary winding to an energizing direct current power supply; a switching control circuit to execute ON/OFF control of the oscillating switching device; and a rectifying smoothing circuit to rectify and smooth an output of the secondary output winding; the constant current output control method for changing an ON/OFF time of the oscillating switching device of the switching power supply circuit, and executing a constant current output control of an output current $I_{2o}$ of the rectifying smoothing circuit comprising:

deriving an OFF adjustment time T3 based on equation (1), $$T3 = T2 \times (Np \div Ns \times Ip_{ref} \div 2 \div I_{2oset} - 1) - T1 \quad (1)$$

where, $I_{2oset}$ represents a set output current of the rectifying smoothing circuit for which the constant current output control is to be executed, Np represents a number of turns of the primary winding, Ns represents a number of turns of the secondary output winding, T1 being a fixed time representing an ON time of the oscillating switching device to excite the primary winding during an oscillation period T, $Ip_{ref}$ representing a reference peak current flowing in the primary winding when the ON time T1 completely elapses, and T2 representing an output time during which output is generated in the rectifying smoothing circuit;

controlling an OFF time of the oscillating switching device during the oscillation period T wherein the OFF time is equal to the sum of the output time T2 and the OFF adjustment time T3; and setting the output current $I_{2o}$ of the rectifying smoothing circuit to the set output current $I_{2oset}$.

2. The constant current output control method for a switching power supply circuit according to claim 1 wherein the output time T2 during which output is generated in the rectifying smoothing circuit is detected based on a time from when a flyback voltage is generated in the primary winding until when a first polarity reversal occurs.

3. The constant current output control method according to claim 1, wherein the output time T2 during which output is generated in the rectifying smoothing circuit is detected based on a time from when a flyback voltage is generated in an auxiliary winding of the transformer until when a first polarity reversal occurs.

4. A constant current output control method for a switching power supply circuit having a transformer provided with a primary winding and a secondary output winding; an oscillating switching device connected in-series with the primary winding so as to connect the primary winding to an energizing direct current power supply; a switching control circuit to execute ON/OFF control of the oscillating switching device at a fixed oscillation period $T_c$; and a rectifying smoothing circuit to rectify and smooth an output of the secondary output winding; the constant current output control method for changing an ON/OFF time of the oscillating switching device of the switching power supply circuit, and executing a constant current output control of an output current $I_{2o}$ of the rectifying smoothing circuit, comprising the steps of:

detecting an output time T2 during which output is generated in the rectifying smoothing circuit;

deriving a set current $Ip_{set}$ based on equation (2), $$Ip_{set} = 2 \times Ns \div Np \times I_{2oset} \times T_c \div T2 \quad (2)$$

where, $T_c$ represents the fixed oscillation period, $I_{2oset}$ represents a set output current of the rectifying smoothing circuit for which the constant current output control is to be executed, Np represents a number of turns of the primary winding, and Ns represents a number of turns of the secondary winding;

adjusting an ON time T1 by stopping ON control of the oscillating switching device when a current Ip flowing in the primary winding reaches the set current $Ip_{set}$; and setting the output current $I_{2o}$ of the rectifying smoothing circuit to the set output current $I_{2oset}$.

5. The constant current output control method for a switching power supply circuit according to claim 4 wherein the output time T2 during which output is generated in the rectifying smoothing circuit is detected based on a time from when a flyback voltage is generated in the primary winding until when a first polarity reversal occurs.

6. The constant current output control method according to claim 4, wherein the output time T2 during which output is generated in the rectifying smoothing circuit is detected based on a time from when a flyback voltage is generated in an auxiliary winding of the transformer until when a first polarity reversal occurs.

7. A constant current output device for a switching power supply circuit having a transformer provided with a primary winding and a secondary output winding; an oscillating switching device connected in-series with the primary winding so as to connect the primary winding to an energizing direct current power supply; and a rectifying smoothing circuit to rectify and smooth an output of the secondary output winding; the constant current output device changing an ON/OFF time of the oscillating switching device of the switching power supply circuit, and executing a constant current output control of an output current $I_{2o}$ of the rectifying smoothing circuit comprising:

a switching control circuit detecting a primary winding current Ip flowing in the primary winding following execution of ON control of the oscillating switching device, and executing OFF control of the oscillating switching device when a primary winding current Ip reaches a set reference peak current $Ip_{ref}$;

an ON time detection portion detecting an ON time T1 of the oscillation switching device;

an output time detection portion that detects an output time T2 during which output is generated from the rectifying smoothing circuit; and an adjustment time calculation circuit deriving an OFF adjustment time T3 from the reference peak current $Ip_{ref}$, the ON time T1 detected by the ON time detection portion, the output time T2 detected by the output time detection portion, based on equation (1), $$T3 = T2 \times (Np \div Ns \times Ip_{ref} \div 2 \div I_{2oset} - 1) - T1 \quad (1)$$

where, $I_{2oset}$ represents a set output current of the rectifying smoothing circuit for which the constant current output control is to be executed, Np represents a number of turns of the primary winding, and Ns represents a number of turns of the secondary winding, and wherein, the switching control circuit executing ON control of the oscillating switching device when the OFF time has elapsed during an oscillation cycle T, the OFF time being the sum of the output time T2 and the OFF adjustment time T3, and sets the output current $I_{2o}$ of the rectifying smoothing circuit to the set output current $I_{2oset}$.

8. The constant current output control device according to claim 7 further comprising:

a primary winding voltage monitoring circuit monitoring a voltage $V_{2a}$ of the primary winding, and detecting a time from generation of a flyback voltage in the primary winding until a first polarity reversal, wherein the time from generation of the flyback voltage in the primary winding until the first polarity reversal is taken to be output time T2.

9. The constant current output control device according to claim 7, further comprising:

an auxiliary winding further provided at the primary side of the transformer; and an auxiliary winding voltage monitoring circuit monitoring a voltage $V_{2a}$ of the primary winding, and detecting a time from generation of a flyback voltage in the auxiliary winding until a first polarity reversal, wherein the time from generation of the flyback voltage in the auxiliary winding until the first polarity reversal is taken to be output time T2.

10. The constant current output control device according to claim 7, further comprising:

an elapsed time estimation portion estimating an OFF elapsed time T3' for executing OFF control of the oscillating switching device (3), following elapse of the output time T2;

a calculation portion setting a comparison time $T2_{ref}$ by multiplying the output time T2 by ($Np \div Ns \times Ip_{ref} \div 2 \div I_{2oset} - 1$); and an OFF time comparator (97) setting potentials $V_{T1}$, $V_{T3'}$ and $V_{T2ref}$ by respectively voltage converting, through multiplication by equal constants, the ON time T1 detected by the ON time detection portion, the OFF elapsed time T3' estimated by the elapsed time estimation portion, and the comparison time $T2_{ref}$ calculated by the calculation portion, and comparing the sum of the potentials $V_{T3'}$ and $V_{T1}$ with $V_{T2ref}$, wherein ON control of the oscillating switching device is executed when the sum of potentials $V_{T3'}$ and $V_{T1}$ exceeds $V_{T2ref}$.

11. The constant current output control device according to claim 7 wherein the switching control circuit executes OFF control of the oscillation switching device when a current Ip' reaches the reference peak current $Ip_{ref}$, the current Ip' being derived from Equation, $$Ip' = Ip + \delta t \times Vcc \div Lp \qquad (3)$$

where, $\delta t$ represents a time difference from detection of when the primary winding current Ip reaches the reference peak current $Ip_{ref}$ until ON operation of the oscillating switching device is stopped, Vcc represents a power supply voltage of the direct current power supply, and Lp represents an inductance of the primary winding.

12. The constant current output control device according to claim 9, further comprising:

an auxiliary winding further provided at the primary side of the transformer; and an auxiliary winding voltage monitoring circuit monitoring a voltage $V_{2a}$ of the primary winding, and detecting a time from generation of a flyback voltage in the auxiliary winding until a first polarity reversal, wherein the time from generation of the flyback voltage in the auxiliary winding until the first polarity reversal is taken to be output time T2.

13. The constant current output control device according to claim 10 wherein the switching control circuit executes OFF control of the oscillation switching device when a current Ip' reaches the reference peak current $Ip_{ref}$, the current Ip' being derived from Equation, $$Ip' = Ip + \delta t \times Vcc \div Lp \qquad (3)$$

where, $\delta t$ represents a time difference from detection of when the primary winding current Ip reaches the reference peak current $Ip_{ref}$ until ON operation of the oscillating switching device is stopped, Vcc represents a power supply voltage of the direct current power supply, and Lp represents an inductance of the primary winding.

14. A constant current output device for a switching power supply circuit comprising a transformer provided with a primary winding and a secondary output winding; an oscillating switching device connected in-series with the primary winding so as to connect the primary winding to an energizing direct current power supply; a switching control circuit executing ON/OFF control of the oscillating switching device at a fixed oscillation period $T_c$; and a rectifying smoothing circuit rectifying and smoothing an output of the secondary output winding; this constant current output device changing an ON/OFF time of the oscillating switching device of the switching power supply circuit, and executing a constant current output control of an output current $I_{2o}$ of the rectifying smoothing circuit comprising:

a primary side current detection portion detecting a current Ip flowing in the primary winding;

an output time detection portion detecting an output time T2 during which output is generated in the rectifying smoothing circuit during an oscillation period T;

a set value calculation circuit that derives a set current $Ip_{set}$ from the output time T2 detected by the output time detection portion, according to equation, $$Ip_{set} = 2 \times Ns \div Np \times I_{2oset} \times T_c \div T2 \qquad (2)$$

where, $T_c$ represents the fixed oscillation period, $I_{2oset}$ represents a set output current of the rectifying smoothing circuit for which the constant current output control is to be executed, Np represents a number of turns of the primary winding, and Ns represents a number of turns of the secondary winding; and a current comparator comparing the current Ip flowing in the primary winding and the set current $Ip_{set}$, wherein the switching control circuit stopping ON control of the oscillating switching device when the current Ip reaches the set current $Ip_{set}$, adjusting the ON time T1, and setting the output current $I_{2o}$ of the rectifying smoothing circuit to the set output current $I_{2oset}$.

15. The constant current output control device for a switching power supply circuit according to claim 14, wherein the primary side current detection portion detects the current Ip based on a voltage drop $V_{ip}$ from a resistance value $r_{ip}$ of an Ip detection resistor that is connected in-series with the primary winding, and the current comparator compares the voltage drop $V_{ip}$ with a set potential $V_{iset}$ that is a multiple of the set current $Ip_{set}$ and the resistance value $r_{ip}$, and compares the current Ip to the set current $Ip_{set}$.

16. The constant current output control device according to claim 14 wherein the current Ip' is taken as the current Ip and compared to the set current $Ip_{set}$, this current Ip' being derived from Equation (3), $$Ip'=Ip+\delta t \times Vcc \div Lp \qquad (3)$$

where, δt is a time difference from detection of when the primary winding current Ip reaches the current $Ip_{set}$ until ON operation of the oscillating switching device is stopped, Vcc represents the power supply voltage of the direct current power supply, and Lp represents the inductance of the primary winding.

17. The constant current output control device according to claim 17 further comprising:
a primary winding voltage monitoring circuit monitoring a voltage $V_{2a}$ of the primary winding, and detecting a time from generation of a flyback voltage in the primary winding until a first polarity reversal, wherein
the time from generation of the flyback voltage in the primary winding until the first polarity reversal is taken to be output time T2.

18. The constant current output control device according to claim 15 wherein the current Ip' is taken as the current Ip and compared to the set current $Ip_{set}$, this current Ip' being derived from Equation (3), $$Ip'=Ip+\delta t \times Vcc \div Lp \qquad (3)$$

where, δt is a time difference from detection of when the primary winding current Ip reaches the current $Ip_{set}$ until ON operation of the oscillating switching device is stopped, Vcc represents the power supply voltage of the direct current power supply, and Lp represents the inductance of the primary winding.

\* \* \* \* \*